US 9,903,719 B2

United States Patent
Hunter, Jr. et al.

(10) Patent No.: US 9,903,719 B2
(45) Date of Patent: Feb. 27, 2018

(54) SYSTEM AND METHOD FOR ADVANCED NAVIGATION

(71) Applicant: Litel Instruments, San Diego, CA (US)

(72) Inventors: Robert O. Hunter, Jr., Snowmass Village, CO (US); Adlai H. Smith, Escondido, CA (US)

(73) Assignee: Litel Instruments, San Diego, CA (US)

( * ) Notice: Subject to any disclaimer, the term of this patent is extended or adjusted under 35 U.S.C. 154(b) by 849 days.

(21) Appl. No.: 14/475,158

(22) Filed: Sep. 2, 2014

(65) Prior Publication Data

US 2017/0023365 A1   Jan. 26, 2017

Related U.S. Application Data

(60) Provisional application No. 61/873,009, filed on Sep. 3, 2013.

(51) Int. Cl.
| | | |
|---|---|---|
| *G01C 21/00* | (2006.01) | |
| *G08G 5/00* | (2006.01) | |
| *G01C 21/16* | (2006.01) | |
| *G01S 19/47* | (2010.01) | |

(Continued)

(52) U.S. Cl.
CPC ......... *G01C 21/005* (2013.01); *G01C 21/165* (2013.01); *G01S 19/45* (2013.01); *G01S 19/47* (2013.01); *G06T 7/74* (2017.01); *G08G 5/0047* (2013.01); *G06T 2207/10024* (2013.01);

(Continued)

(58) Field of Classification Search
CPC ...... G01C 21/005; G01C 21/165; G06T 7/74; G01S 19/45; G01S 19/47; G08G 5/0047
See application file for complete search history.

(56) References Cited

U.S. PATENT DOCUMENTS

| 5,146,228 A | * 9/1992 | Irani ................. G06T 7/74 |
| | | 342/64 |
| 5,828,793 A | 10/1998 | Mann |
| 6,141,433 A | 10/2000 | Moed et al. |
| | (Continued) | |

OTHER PUBLICATIONS

Non-Final Office Action on U.S. Appl. No. 14/475,102 dated Jan. 4, 2016, 15 pages.

(Continued)

*Primary Examiner* — Thomas G Black
*Assistant Examiner* — Sze-Hon Kong
(74) *Attorney, Agent, or Firm* — Foley & Lardner LLP

(57) ABSTRACT

Systems and methods relating to assessing a navigation subsystem are provided. One method includes: acquiring a ground image associated with a nominal position; assigning one or more texture classes to each of a plurality of pixels of the ground image; partitioning the processed ground image into a plurality of ground image sub regions; retrieving a reference image from an atlas of reference images; generating a plurality of matching statistics comprising a matching statistic for each ground image sub region by comparing the ground image sub region to a portion of the reference image; calculating a calculated position of the ground image and an uncertainty associated with the calculated position based on the matching statistics; and determining critique data associated with the navigation subsystem based on a comparison of the calculated position of the ground image with at least one position determined by the navigation subsystem.

10 Claims, 14 Drawing Sheets

(51) Int. Cl.
    *G01S 19/45* (2010.01)
    *G06T 7/73* (2017.01)
(52) U.S. Cl.
    CPC .............. *G06T 2207/10032* (2013.01); *G06T 2207/30184* (2013.01); *G06T 2207/30252* (2013.01)

(56) References Cited

U.S. PATENT DOCUMENTS

| | | | |
|---|---|---|---|
| 6,654,690 | B2 | 11/2003 | Rahmes et al. |
| 6,707,464 | B2 | 3/2004 | Ham et al. |
| 6,900,760 | B2 | 5/2005 | Groves |
| 6,937,349 | B2 | 8/2005 | Jones et al. |
| 7,248,964 | B2 | 7/2007 | Bye |
| 7,408,629 | B2 | 8/2008 | Qwarfort et al. |
| 7,643,939 | B2 | 1/2010 | Zeng et al. |
| 7,873,472 | B2 | 1/2011 | Zeng et al. |
| 7,885,480 | B2 | 2/2011 | Bryll et al. |
| 7,890,260 | B2 | 2/2011 | Ring |
| 7,974,460 | B2 | 7/2011 | Elgersma |
| 8,024,119 | B2 | 9/2011 | Zeng et al. |
| 9,529,082 | B1* | 12/2016 | Rikoski ............ G01S 7/52003 |
| 2002/0041328 | A1* | 4/2002 | LeCompte .......... G01C 11/025 348/144 |
| 2006/0215935 | A1* | 9/2006 | Oldroyd ............... G01C 11/00 382/294 |
| 2007/0096979 | A1 | 5/2007 | Hinnant et al. |
| 2007/0122058 | A1* | 5/2007 | Kitaura ................ G06T 7/579 382/284 |
| 2008/0243383 | A1* | 10/2008 | Lin ..................... G01C 21/165 701/469 |
| 2009/0256909 | A1* | 10/2009 | Nixon .................. B64D 47/08 348/144 |
| 2010/0010741 | A1* | 1/2010 | Tener .................... F41G 7/34 701/500 |
| 2010/0013927 | A1* | 1/2010 | Nixon .................. G01C 11/06 348/144 |
| 2012/0050525 | A1* | 3/2012 | Rinner ................. G06T 7/0028 348/117 |
| 2012/0143808 | A1* | 6/2012 | Karins .................. G06N 7/005 706/46 |
| 2012/0170808 | A1* | 7/2012 | Ogata ................ B60R 21/0134 382/103 |
| 2012/0281503 | A1* | 11/2012 | Rikoski ............... G01C 21/005 367/88 |
| 2012/0308084 | A1* | 12/2012 | Perrier ..................... G06T 7/20 382/107 |
| 2013/0041549 | A1* | 2/2013 | Reeve .................. B62D 15/025 701/28 |
| 2013/0069944 | A1* | 3/2013 | Altman ................... G06T 17/05 345/420 |
| 2013/0080359 | A1* | 3/2013 | Will ...................... B60W 40/06 706/12 |
| 2013/0182108 | A1* | 7/2013 | Meadow ................ G06T 17/05 348/143 |
| 2014/0368507 | A1* | 12/2014 | Altman .................. G06T 17/05 345/426 |
| 2015/0061927 | A1* | 3/2015 | Jin ......................... G01S 13/90 342/25 F |
| 2015/0071490 | A1* | 3/2015 | Fukata ................ G06K 9/00791 382/103 |
| 2015/0170526 | A1* | 6/2015 | Wang .................... B64C 19/00 701/16 |
| 2015/0204652 | A1* | 7/2015 | Olsson ................... G01S 17/89 356/72 |
| 2017/0004345 | A1* | 1/2017 | Sasaki .................. G06K 9/0063 |

OTHER PUBLICATIONS

U.S. Appl. No. 13/443,684, filed Apr. 10, 2012, Hunter et al.
U.S. Appl. No. 61/644,255, filed Hunter, Jr. et al.
Averbuch et al., Image Registration Using Implicit Similarity and Pixel Migration, pp. 1-14.
Barbour et al., Inertial Instruments: Where to Now?, pp. 566-574.
Brewin, LightSquared Cellular Network Interferes With All GPS Applications, Latest Tests Show, Jun. 10, 2011, printed from Internet address: http://www.nextgov.com/nextgov/ng_20110610_6517.php on Oct. 25, 2011, 3 pgs.
Bunting et al., An Area Based Technique for Image-To-Image Registration of Multi-Modal Remote Sensing Data, 2 pgs.
Chave, A Lightweight Low-Power Magnetometer-Based UAV Flight Control System, ELEC 480, dated Nov. 3, 2005, 70 pgs.
Cramer, GPS/INS Integration, Photogrammetric Week '97, pp. 1-10.
DeBonet et al., Structure-Driven SAR Image Registration, 11 pgs.
Dickey-John Corporation, Radar III Ground Speed Sensor (2005), 2 pgs.
Easley et al., Geometric Transforms and Their Applications to SAR Speckle Reduction, Algorithms for Synthetic Aperture Radar Imagery, Proceedings of SPIE vol. 5095 (2003), pp. 110-118.
Fjortoft et al., Optimal Edge Detection and Edge Localization in Complex SAR Images with Correlated Speckle, IEEE Transactions on Geoscience and Remote Sensing, vol. 37, No. 5, Sep. 1999, pp. 2272-2281.
Frost et al., A Model for Radar Images and Its Application to Adaptive Digital Filtering of Multiplicative Noise, IEEE Transactions on Pattern Analysis and Machine Intelligence, vol. PAMI-4, No. 2, Mar. 1982, pp. 157-166.
Gens, Terrain Correction and Ortho-Rectification, pp. 1-11.
Glasbey, SAR Image Registration and Segmentation Using an Estimated DEM, 1997, In "Energy Minimization Methods in Computer Vision and Pattern Recognition" Lecture Notes in Computer Science, 1223, Springer, Berlin, 507-520, 14 pgs.
Goncalves et al., Precise Orientation of Spot Panchromatic Images with Tie Points to a SAR Image, 6 pgs.
GPS Jamming, No Jam Tomorrow, The Economist, printed from Internet address: http://www.economist.com/node/18304246, 4 pgs.
Hellwich et al., Sensor and Data Fusion Contest: Test Imagery to Compare and Combine Airborne SAR and Optical Sensors for Mapping, 4 pgs.
Hong et al., A Robust Technique for Precise Registration of Radar and Optical Satellite Images, Photogrammetric Engineering & Remote Sensing, vol. 71, No. 5, May 2005, pp. 585-593.
Hong, Image Fusion, Image Registration, and Radiometric Normalization for High Resolution Image Processing, Geodesy and Geomatics Engineering UNB, Technical Report No. 247, Apr. 2007, 218 pgs.
Huang et al., Feature-Based Image Registration Using the Shape Context, International Journal of Remote Sensing, 2010, 8 pgs.
Iran Hijacked US Drone, Says Iranian Engineer, The Christian Science Monitor, printed from Internet address: http://www.csmonitor.com/World/Middle-East/2011/1215/Exclusive-Iran_hijacked_US-drone-sa on Dec. 21, 2011, 5 pgs.
Jia et al., SAR Image and Optical Image Registration Based on Contour and Similarity Measures, pp. 341-345.
Kang et al., Automatic SAR Image Registration by Using Element Triangle Invariants, 7 pgs.
Kopp, Almaz S-300—China's "Offensive" Air Defense, printed from Internet address: http://www.strategycenter.net/research/pubID.93/pub_detail.asp on Jul. 25, 2012, 13 pgs.
Kopp, Self Propelled Air Defence System SA-11/17, Technical Report APA-TR-2009-0706, Jul. 2009, printed from Internet address: http://www.ausairpower.net/APA-9K37-Buk.html on Jul. 25, 2012, 50 pgs.
Kostelec et al., Image Registration for MRI, Modern Signal Processing, MSRI Publications, vol. 46, 2003, pp. 161-184.
Lehureau et al., Registration of Metric Resolution SAR and Optical Images in Urban Areas, 4 pgs.
Li et al., Contour-Based Multisensor Image Registration, 1992 IEEE, pp. 182-186.
Li et al., Registration of Radar and Optical Satellite Images Using Mutliscale Filter Technique and Information Measure, pp. 457-476.

(56) References Cited

OTHER PUBLICATIONS

Lopes et al., Adaptive Speckle Filters and Scene Heterogeneity, IEEE Transactions on Geoscience and Remote Sensing, vol. 28, No. 6, Nov. 1990, pp. 992-1000.
Maurer et al., Synthetic Aperture Radar/Landsat MSS Image Registration, NASA Reference Publication 1039, Jun. 1979, 237 pgs.
McGuire, An Image Registration Technique for Recovering Rotation, Scale and Translation Parameters, Mar. 25, 1998, pp. 1-46.
Merlin et al., Using Layovers in Fusion of Optical and Sar Data Application to Mustang Landscape Analysis, Proceedings of the CEOS SAR Workshop, Toulouse, Oct. 26-29, 1999, pp. 503-507.
Ndili et al., Coding Theoretic Approach to SAR Image Segmentation, Algorithms for Synthetic Aperture Radar Imagery VIII, Proceedings of SPIE vol. 4382 (2001), pp. 103-111.
O'Connor, Soviet/Russian SAM Site Configuration, Technical Report APA-TR-2009-1205-B, Jan. 2010, printed from Internet address: http://www.ausairpower.net/APA-Rus-SAM-Site-Configs-B.html on Jul. 25, 2012, 27 pgs.
Olfati-Saber, Distributed Kalman Filtering and Sensor Fusion in Sensor Networks, pp. 1-13.
Parekh, Design, Implementation and Performance Evaluation of Synthetic Aperture Radar Signal Processor on FPGAs, Masters Thesis, Jun. 23, 2000, 35 pgs.
Pluim et al., Mutual Information Based Registration of Medical Images: A Survey, IEEE Transactions on Medical Imaging, vol. XX, No. Y, 2003, pp. 1-21.
Poulain et al., High-Resolution Optical and SAR Image Fusion for Building Database Updating, IEEE Transactions on Geoscience and Remote Sensing, vol. 49, No. 8, Aug. 2011, pp. 2900-2910.
Rawnsley, North Korean Jammer Forces Down U.S. Spy Plane, printed from Internet address: http://www.wired.com/dangerroom/2011/09/north-korean-jammer-forces-down-u-s-spy-p on Oct. 25, 2011, 3 pgs.
Reinartz et al., Orthorectification of VHR Optical Satellite Data Exploiting the Geometric Accuracy of TerraSAR-X Data, ISPRS Journal of Photogrammetry and Remote Sensing 66 (2011), pp. 124-132.
Roche et al., The Correlation Ratio as a New Similarity Measure for Multimodal Image Registration, 1998 Springer Verlag, Proceedings MICCAI'98, vol. 1496 of LNCS, 1115-1124, 10 pgs.
Shu et al., SAR and Spot Image Registration Based on Mutual Information with Contrast Measure, IEEE 2007, pp. 429-432.
Sijs et al., Optimal Decentralized Kalman Filter, 17th Mediterranean Conference on Control & Automation, Jun. 24-26, 2009, pp. 803-808.
Subrahmanyam et al., Edge-Preserving Unscented Kalman Filter for Speckle Reduction, 2008 IEEE, 4 pgs.
Suri et al., Application of Generalized Partial Volume Estimation for Mutual Information based Registration of High Resolution SAR and Optical Imagery, pp. 1257-1264.
Suri et al., Combining Mutual Information and Scale Invariant Feature Transform for Fast and Robust Multisensor SAR Image Registration, 12 pgs.
Suri et al., On the Possibility of Intensity Based Registration for Metric Resolution SAR and Optical Imagery, 19 pgs.
TGSS True Ground Speed Sensor 740, User Manual HY33-5005-IB/US, Ed. Jan. 2012, 23 pgs.
Vassilaki et al., Geospatial Data Integration Using Automatic Global Matching of Free-Form Curves, ISDE 2008, Digital Earth Summit on Geoinformatics, Potsdam, Germany, Nov. 12-14, 2008, 24 pgs.
Wegner et al., Image Analysis of Fused SAR and Optical Images Deploying Open Source Software Library OTB, 5 pgs.
Wegner, Automatic Fusion of SAR and Optical Imagery based on Line Features, 4 pgs.
Wegner, Automatic Fusion of SAR and Optical Imagery, Sep. 2007, 117 pgs.
Wessel et al., Registration of Near Real-Time SAR Images by Image-To-Image Matching, International Archives of Photogrammetry, Remote Sensing and Spatial Information Sciences, 36, pp. 179-184.
Winn, North Korea's GPS Jammer Brigade, Sep. 16, 2011, printed from Internet address: http:/www.globalpost.com/dispatch/news/regions/asia-pacific/110916/north-korea%E2% on Oct. 25, 2011, 3 pgs.
Wong et al., AISIR: Automated Inter-Sensor/Inter-Band Satellite Image Registration Using Robust Complex Wavelet Feature Representations,Pattern Recognition Lett. (2009), doi:10.1016/j.patrec.2009.05.16., 8 pgs.
Yousif, Multitemporal Spaceborne SAR and Fusions of SAR and Optical Data for Unsupervised Change Detection in Shanghai, Master's of Science Thesis in Geoinformatics, Dec. 2009, 117 pgs.
Zhang et al., Bayesian-Based Speckle Supression for SAR Image Using Contourlet Transform, Journal of Electronic Science and Technology of China, vol. 6, No. 1, Mar. 2008, pp. 79-82.
Zitova et al., Image Registration Methods: A Survey, Jun. 26, 2003, 24 pgs.

\* cited by examiner

| Texture | Unusable | Useable sometimes | Useable | * RGB | Comment |
|---|---|---|---|---|---|
| glints | X | | | | Present for radar / lidar / mm wave. In some circumstances, could render entire image unusable. |
| cloud / fog | X | | | | Present in optical, ir. Usually range filtered from LIDAR. |
| shadow | | X | | N | Present for radar / LIDAR / mm wave and possibly in low altitude natural illumination. Can be used as a texture by itself (no ground pixels) or included with ground images. If it overwhelms the image, it can render entire image unusable. |
| water | | X | | Y | Useable provided there are enough ground pixels or useable shadows. |
| ground | | | X | Y | Generally most useful texture. |

Figure 9

SYSTEM AND METHOD FOR ADVANCED NAVIGATION

CROSS-REFERENCE TO RELATED APPLICATIONS

This application claims the benefit of priority of U.S. Provisional Patent Application No. 61/873,009, filed Sep. 3, 2013, entitled "SYSTEM AND METHOD FOR ADVANCED NAVIGATION," which is incorporated herein by reference in its entirety.

TECHNICAL FIELD

The present disclosure relates to the field of automated navigation, both aerial & ground navigation.

BACKGROUND

At the very beginning of aviation, dead reckoning navigation utilized astronomical sightings or terrestrial features as waypoints for correcting & updating aerial platform position. Initially, in terrestrial feature or ground point positioning the pilot or navigator sighted the object & flew over it at the desired heading noting the time in the navigational log. This action of sighting, correcting course & physically transiting the ground point at a noted time & measured offset (vertical & horizontal) constituted the navigational fix or update. Accuracy was limited by many factors and was superseded by LORAN (LOng RAnge Navigation) which in its final implementation (LORAN-C) had location accuracies of 50 meters ([m]) but required ~20 permanent ground transmitting stations arrayed across the continental US (CONUS) to service CONUS air traffic. Updated but undeployed versions of LORAN (e-LORAN) promise greater accuracies (8 [m]) but still require numerous ground based transmitting stations over the service area to attain maximum accuracy. So while LORAN & other terrestrial radio based positioning systems can be used beyond the fringes of their ground based networks their accuracy diminishes as the distance increases and the transmitter directional diversity decreases. For example, the OMEGA radio positioning system had worldwide coverage using 9 ground transmitters but its positional accuracy was only 2.2 kilometers ([km]).

Ground based radio navigation positioning systems (radio nav) have been largely replaced by global navigation satellite systems (GNSS) such as the global positioning system (GPS) or its Russian equivalent GLONASS. Civilian GPS operating autonomously typically have accuracies in the 10-20 [m] range unless they have been initialized for a least 15 min. by remaining motionless with unobstructed sky view to 5 degrees above the horizon. At this point, sub meter (<~10 cm) accuracy is obtainable with roving GPS receivers by adding their received coarse acquisition (CA) signal to an offset signal transmitted by the now motionless, initialized base station. The wide area augmentation system (WAAS) of the Federal Aviation Administration is a CONUS wide version of this concept. In this case ground reference stations receive satellite GPS signals, calculate the offset from the CA signal & uplink the corrections to WAAS dedicated satellites which then transmit the correction to commercial airplanes providing higher accuracy positional data (7.6 [m] or better). To achieve this performance, with high reliability, ~20 permanent ground based reference stations distributed across CONUS are required. The US Coast Guard implemented a similar system (DGPS or differential GPS) with higher accuracies (~10 cm) but requiring a higher concentration of ground stations (~60 ground stations to cover CONUS navigable waterways).

GPS denial is always a possibility. GPS satellites broadcasting 25 [Watts] at ~11,000 [mile] range can be swamped by readily available, equal power jammers operating at much closer range (<10-100 [mi]). Better GPS signal conditioning, directional antennas, & deeply integrated GPS/INS flight computers can somewhat ameliorate this ~40-60 [dB] jammer advantage. Examples of civilian GPS being jammed are numerous, the former LightSquared being the poster child; their network base stations interfered with GPS receivers at distances from 600 [ft.] to 185 miles. Reports of significant interference with US military GPS have also been reported with the US drone diverted by the Iranians being the most prominent. So it is desirable for military systems to have the ability to augment GPS capabilities in GPS compromised situations. It is also desirable that the more vulnerable civilian aircraft also have the ability to accurately navigate in the face of intentional or unintentional GPS interference.

Inertial navigation systems (INS) are immune from the same sort of interference GPS is susceptible to. Over the last 20 years, significant advances in size, weight, durability, & power consumption have been made but not so much in accuracy. Their drift as a function of time is characterized by FIG. 1 which shows the performance bands for 3 classes of systems, low, moderate, & high cost. At times <<~1-2 [min] their accuracy is limited by scale factor stability and is characterized by a positional error that increases linearly in time while for times >>~1-2 min bias stability dominates with integrated positional error increasing quadraticly with time. This rapid deterioration renders all INS systems incapable of even rough navigation (<200 [m] CEP) without positional updates at 1 [hr.] or more frequent intervals. For precise munition delivery (<=2 [m] net CEP) and assuming the munitions' INS system is positionaly updated 1 min before impact, a low cost (10 k$) INS (CEP(1 min)~40 [m]) is unusable, a moderate cost (100 k$) INS (CEP(1 min)=1-2 [m]) is a possibility, while a high cost (>750 k$) system (CEP(1 min)~0.4 [m]) is too expensive. High cost (>750 k$) systems would not be used in munitions but on manned (military or civilian) aircraft & other strategic platforms.

For ground based vehicles, in addition to intentional or unintentional electromagnetic interference of GPS, steep local terrain can obscure GPS satellites resulting in a loss of positioning function (fewer than 3 satellites visible). Even the most sophisticated ground based vehicles do not have INS systems so this loss of function is without recourse.

So given the ability to deny GPS coverage, the difficulty of utilizing ground based radio transmitters for navigation over denied territory, & the short time frame of accurate INS capabilities it would be desirable to have a system & method for securely, quickly, & reliably updating the flight navigation solution systems in an autonomous fashion. It is also desirable to have a system & method for determining the accuracy & reliability of navigation subsystems comprising the flight navigation system. It is also desirable to have a ground navigation system that can function in the absence of GPS.

SUMMARY

One embodiment relates to a navigation system including one or more navigation subsystems configured to determine a position of a platform. The system further includes a first processor configured to receive one or more outputs of the one or more navigation subsystems and generate a navigation solution, and a sensor configured to generate a ground image. The system further includes a second processor configured to: process the ground image into one or more of a plurality of textures to generate a processed ground image; determine an estimated location of the ground image; partition the processed ground image into a plurality of ground image sub regions; retrieve a reference image from an atlas of reference images, each reference image in the atlas having an associated accuracy, resolution, and projection, the reference image having a position, projection, and extent determined based on the estimated location and a ground image projection of the ground image; generate a plurality of matching statistics comprising a matching statistic for each ground image sub region by comparing the ground image sub region to a portion of the reference image; calculate a relative position of the ground image with respect to the reference image based on the matching statistics; determine critique data associated with at least one of the one or more navigation subsystems based on the relative position of the ground image with respect to the reference image, the critique data comprising at least one of an error or a status of the at least one navigation subsystem; and transmit the critique data to the first processor. The first processor is further configured to adjust one or more parameters associated with the at least one navigation subsystem based on the critique data.

Another embodiment relates to a method of assessing a navigation subsystem. The method includes: acquiring a ground image associated with a nominal position; assigning one or more of a plurality of texture classes to each of a plurality of pixels of the ground image; partitioning the processed ground image into a plurality of ground image sub regions; retrieving a reference image from an atlas of reference images, each reference image in the atlas having an associated accuracy, resolution, and projection, the reference image selected based on the nominal position and a ground image projection of the ground image; generating a plurality of matching statistics comprising a matching statistic for each ground image sub region by comparing the ground image sub region to a portion of the reference image; calculating a calculated position of the ground image and an uncertainty associated with the calculated position based on the matching statistics; and determining critique data associated with the navigation subsystem based on a comparison of the calculated position of the ground image with at least one position determined by the navigation subsystem, the critique data relating to an accuracy of the navigation subsystem.

Yet another embodiment relates to a system including a processor configured to: store a history of navigation solutions associated with one or more navigation subsystems configured to determine a position of a platform; acquire a ground image from a sensor; process the ground image into one or more of a plurality of textures to generate a processed ground image; determine an estimated location of the ground image and an estimated location error associated with the estimated location; apply a down sampling ratio to the processed ground image; partition the processed ground image into a plurality of ground image sub regions; retrieve a reference image from an atlas of reference images, each reference image in the atlas having an associated accuracy, resolution, and projection, the reference image having a position, projection, and extent determined based on the estimated location and a ground image projection of the ground image; generate a plurality of matching statistics comprising a matching statistic for each ground image sub region by comparing the ground image sub region to a portion of the reference image; calculate a relative position of the ground image with respect to the reference image based on the matching statistics; determine critique data associated with at least one of the one or more navigation subsystems based on the relative position of the ground image with respect to the reference image, the critique data comprising at least one of an error or a status of the at least one navigation subsystem; and transmit the critique data to a second processor configured to adjust one or more parameters associated with the at least one navigation subsystem based on the critique data.

BRIEF DESCRIPTION OF THE FIGURES

FIG. 9 is a table illustrating some example textures of corresponding properties, according to one embodiment.

DETAILED DESCRIPTION

An advanced navigation system comprising a sensor for acquiring an image of the ground, an algorithm & processing means for matching the image to an image in an atlas and reducing it to a platform longitude & latitude and a procedure for assessing the state of other navigational subsystems is described. Versions suitable for flight and ground navigation are described.

Briefly, while the platform is underway, an image of the local surroundings is taken at different times. This image is automatically matched to a section of an onboard atlas & this correspondence provides an independent assessment of platform location. This is then possibly compared with positions as determined by navigational subsystems or composites (i.e. a deeply integrated GPS/INS navigation solution) and an assessment of subsystem accuracy & reliability is made and forwarded to the flight computer which can then decide which subsystems should contribute to the total navigation solution and to possibly reset/update the current position. For a ground vehicle, we typically only check on the accuracy & availability of GPS and a simple navigation computer then decides which solution (GPS or image based) to utilize in its navigation solution.

Figure 2:
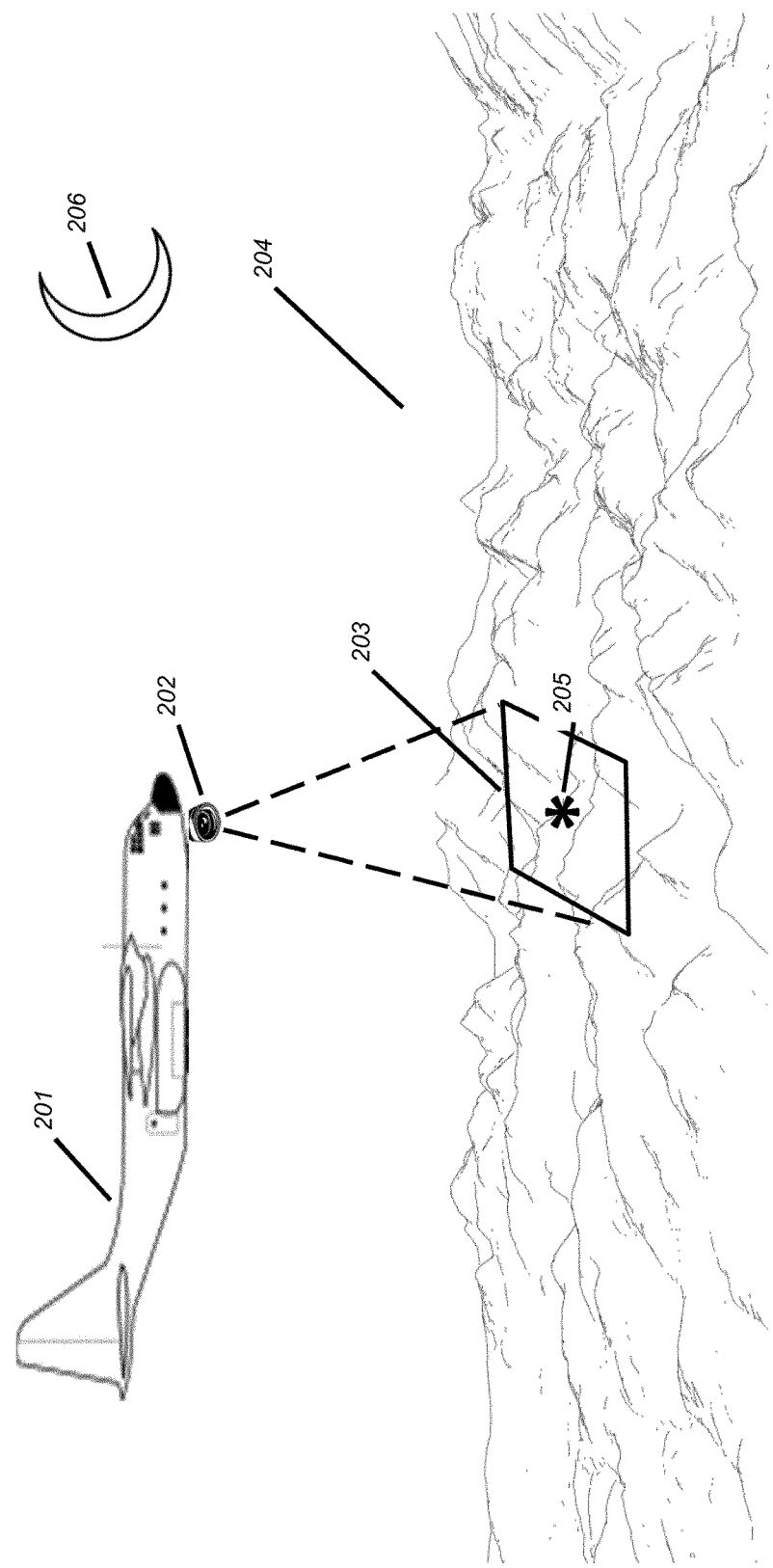
FIG. 2 is an illustration of an aircraft collecting ground image data, according to one embodiment.

Referring to FIG. 2, an aerial platform 201 (airplane, UAV, bomb, missile, etc.) with an image sensor 202 acquires an image of a portion of the ground 203, comprising a part (typically ~0.1-few [km^2] area) of an entire ground scene 204. This image capture takes place over a specific time or time interval. In the case of passive image collection in the IR or optical bands, the exposure could take place over a sufficiently short time that blurring is negligible or could be provided by a short stroke effectively gimbaled optic slewing to compensate for platform 201 motion. Actively illuminated imagery such as synthetic aperture radar (SAR) is acquired over a time period <~1 min during which platform motion is used to effectively increase antenna size (thus increasing resolution). In these cases, the image acquisition time is taken as the midpoint of the radar illumination interval. Other meta data associated with the image such as image position (latitude, longitude, altitude above ellipsoid at one or more points in image to establish orientation), platform position & orientation during image acquisition, pixel size, and possibly image sensor model information (camera model) is also provided to the ground point positioning (GPP) system processor 3001.

Up to this point in time, navigation system & navigation subsystem solutions, 5001, are stored at sampling rates dependent on their inherent bandwidths (0.01 Hz-~2 Hz). Based on the discrepancies between these different solutions and their prior discrepancies with GPP determined positions, a window determining the probable position & uncertainty of the GPP image is calculated. In more detail, if P(tk,l)= position (latitude or longitude) as determined by sensor subsystem 1 (=INS, GPS, radio navigation, dead reckoning, GPP, complete navigation solution, etc.) at time tk, then we look at the difference in this position with that determined at a previous time, tk−1, getting:

$$\Delta P(tk,l) = P(tk,l) - P(tk-1,l) \quad \text{(eq. 1)}$$

Here tk−1 is the time at which the last GPP position was determined and we form the difference to eliminate any long term drifts (this is especially useful for INS and spoofed GPS systems). The time difference between GPP updates, tk−tk−1 is typically >~10 min but could be ~1 min for a munition shortly before impact. The estimated position of the GPP image at time tk is then:

$$P(tk,\text{GPP}) = P(tk-1,\text{GPP}) + \Delta P(tk) \quad \text{(eq. 2)}$$

Where $\Delta P(tk)$ is the average of the eq. 1 contribution subsystems other than GPP weighted (wl) by their status (0/1 for no good/OK) and estimated (possibly from a subsystem Kalman filter) variances as wl=iok/σl$^2$. Based on this we estimate the uncertainty (standard deviation) in $\Delta P(tk)$ which then sets the size of an initial search window to ~3 times the standard deviation. This uncertainty is set by the spread in the various navigational solutions we are comparing. Based on this estimated position and uncertainty in position, the image metadata is adjusted and we attempt to determine the GPP image location in the image atlas. If this process fails, the window size is increased and the calculations are repeated. By saving the additional sub region matching statistic we can economize the required recalculation at an enlarged window size. At a definite point in window size, if no match has been found, we terminate the GPP location process, and the GPP solution record is updated to reflect this failure. On successful location, the GPP solution is updated and navigational critiques, 5003 of each subsystem are computed and forwarded to flight computer 3101 which can be used by its internal modal logic to update navigational subsystem status (good/no good), change the subsystems utilized in the final navigation solution 3102, and possibly reset the platform position (uncoupled Kalman filter).

As described below, the ground platform version operates similarly.

Aerial Platform

An airborne platform 201 equipped with an image sensor 202 capable of capturing an image of the ground 203. This GPP sensor can be passive, utilizing natural light and working in optical or infrared bands. It could also be an active system such as synthetic aperture radar (SAR), LIDAR or a millimeter wave imager. Airborne platform 201 is also equipped with a conventional flight navigation system 3100 part of which could be several navigational subsystems 3103, 3104, 3105 capable of independent assessment of platform position. Output from the navigational sensors and navigational subsystems can form inputs to flight computer 3101 which reconciles them (typically with a deeply integrated Kalman filter) to produce a navigation solution, 3102, used to set platform course and course corrections. In addition to conventional flight navigation system 3100 a ground point positioning (GPP) system 3000 comprising GPP sensor 202 and GPP processor 3001 that communicates with conventional flight navigation system 3100 providing critiques of the autonomous and combined navigation solutions of 3100.

Figure 5:
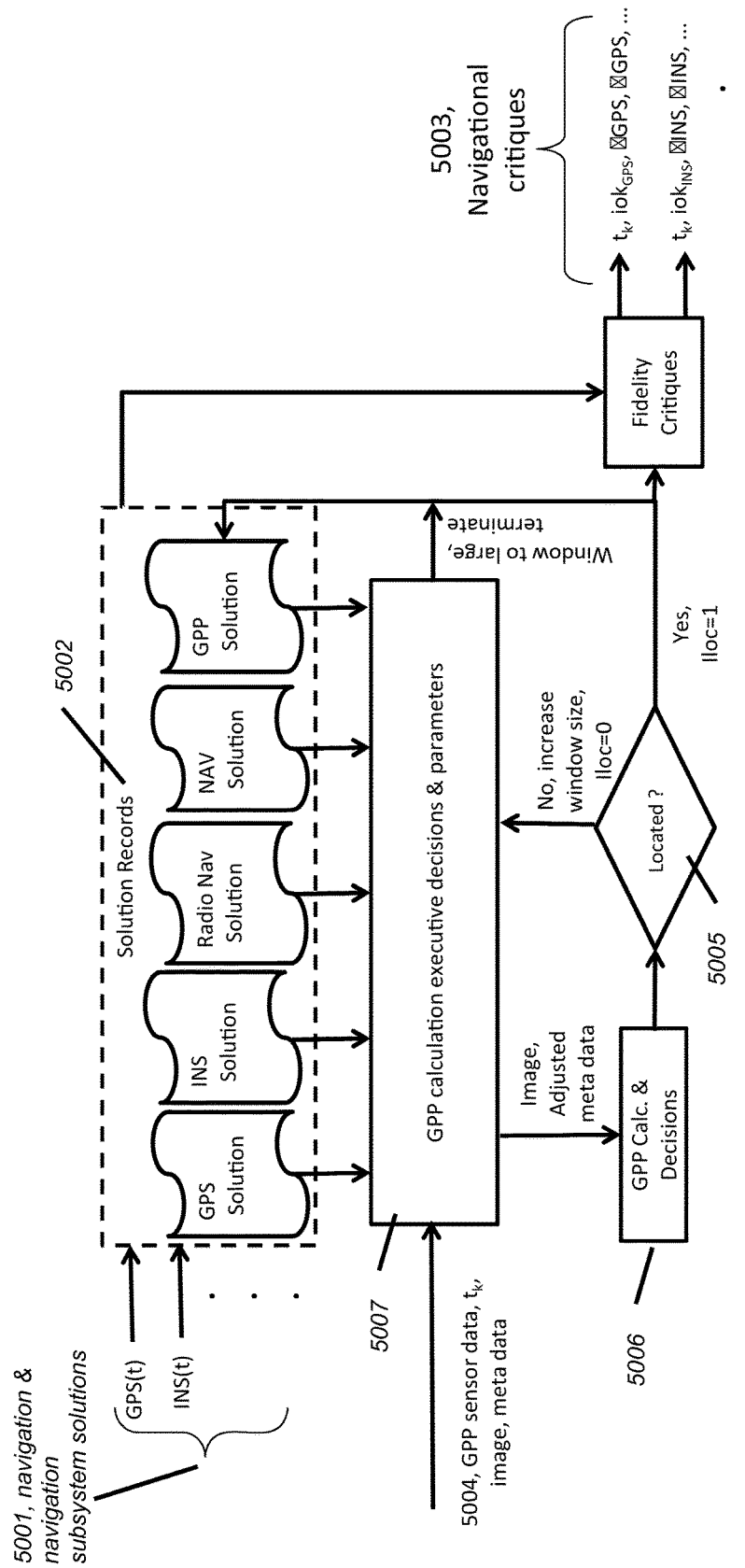
FIG. 5 is an information flow diagram of a single texture case for generation of navigational solution critiques, according to one embodiment.

Although the INS and GPS systems are typically combined in a deeply integrated Kalman filter utilizing the INS derived heading to aid in the GPS code tracking loops enhances the accuracy of GPS it is not always reliable, especially in the face of heavy but undetected GPS signal jamming. Turning to FIG. 5, navigation subsystem solutions, 5001, are stored at sampling rates dependent on their inherent bandwidths (0.01 Hz-~2 Hz). GPP sensor data, time, and image meta data are further inputs to GPP processor 3001.

In addition to a history of navigation solutions, 3001 also contains an atlas of reference images covering the area of interest. The resolution, accuracy and area of coverage will depend on the platform & it's function, but for reference, a moderate resolution map (~16 [m$^2$] pixels at with accuracy ~0.5 [m] covering the world's land mass, with 50% compression would require 4.6 [Terabyte]. The atlas is typically optical satellite imagery resulting from multiple passes to assure cloud free coverage, corrected for image acquisition distortion and offsets, and stitched together forming an orthorectified, seamless map.

Figure 7:
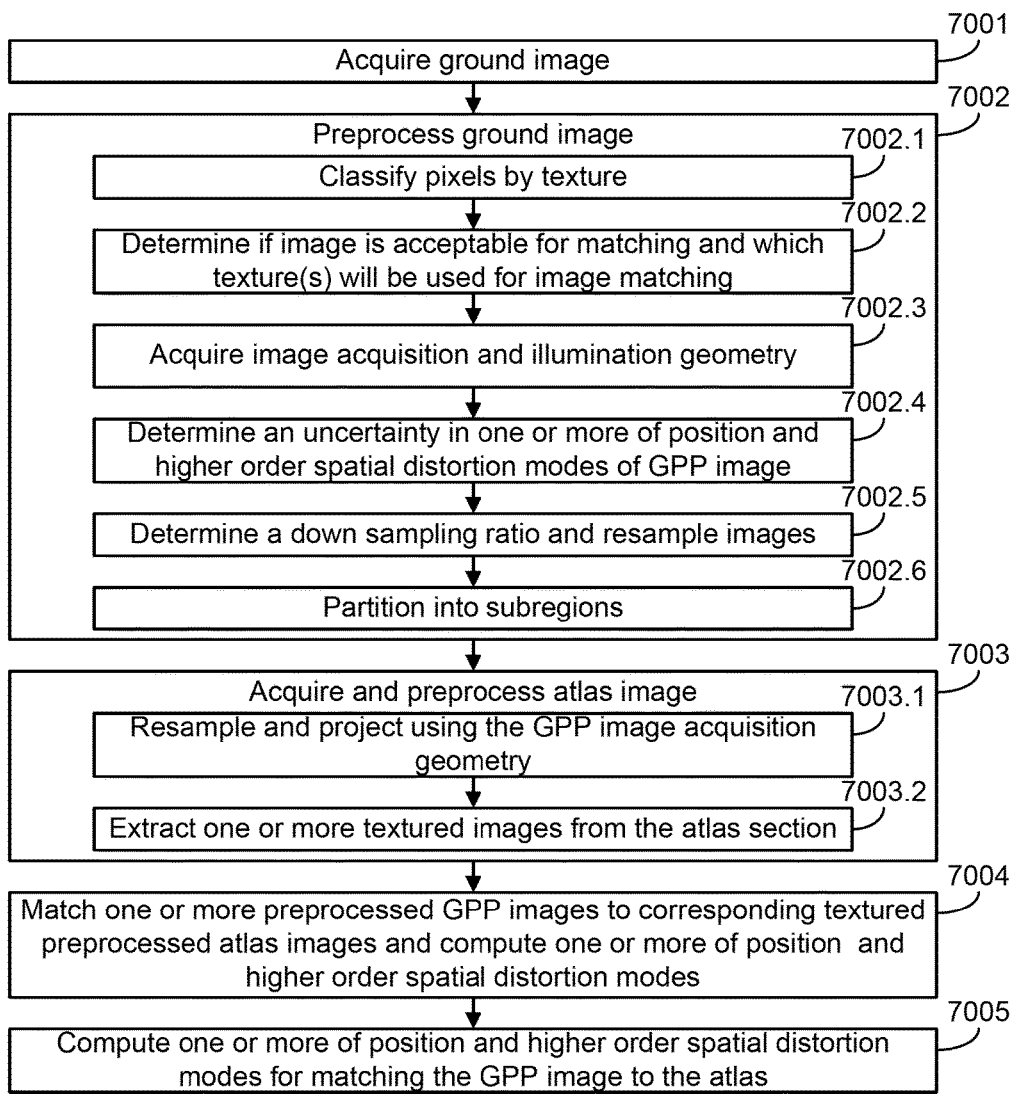
FIG. 7 is a flow diagram of a process for obtaining platform position using ground point positioning, according to one embodiment.

FIG. 7 illustrates the steps carried out to obtain the platform position using ground point positioning. GPP sensor 202 acquires an image of a portion of the ground and along with image meta data describing nominal platform position, camera orientation, pixel size and image capture time, forwards it to GPP processor 3001.

Next, a sequence of steps as described in detail in copending patent application "Method & System for High Accuracy & Reliability Registration of Multi Modal Imagery" by the present inventors provisionally filed May 18, 2012, 61/644,255, hereafter ref 1 and herein incorporated by reference in its entirety is carried out to compute the platform position as determined by the GPP image.

First (7002) the GPP image is preprocessed. This involves first (7002.1) a texture classification of GPP image pixels. By classifying pixels and excluding or including the pixel classes in the subsequent matching (to the atlas) calculation we substantially increase the robustness of the process. FIG.

9 summarizes some useful textures and their characteristics. Excluded pixels are ones we refrain from directly using because of the lack of correlation with atlas imagery; this decision takes the image context (physical imaging & illumination conditions for the GPP image) into account. For example, identifiable thick cloud or fog cover is typically distinguishable from a high albedo earth surface by its more uniform reflectance with said reflectance being sometimes rendered more uniform by camera blurring caused by being enough out of focus relative to the ground. Other examples include bright (high intensity) radar return (glints) in coherently illuminated imagery (such as SAR or LIDAR) which can be identified according to the methods of ref 1. Another example of useful texture classification is contiguous bodies of water. At more mid intensity range returns, pixels comprising contiguous bodies of water encompassing >5%-10% of the image are identified and classified as such. At low intensities, extensive, contiguous, shadow regions can also be identified and so classified. These are typically present in SAR, LIDAR, mm wave and possibly low altitude moonlit imagery (minimal diffuse illumination present). Extensive shadows can render the entire image unusable. The remaining pixels are ground pixels. Additionally, if GPP sensor 201 is a color optical camera, then some texture classes (ground, water) can be tripled in size, each color channel (red, green, blue) creating a new sub texture.

With all of the GPP pixels classified, we now determine whether the image is useable or not and in which textures we will attempt to match it to the reference atlas (step 7002.2). We compute the fraction of pixels within each texture (no RGB sub texturing used at this point). Amongst those present in FIG. 9, the fraction representing clouds/fog is fTc, glints or coherent artifacts is fTg, water bodies is fTw, large contiguous shadows is fTs, and the remainder is normal or ground pixels (fTn). This texture classification can be further refined. Next, images with a large enough fraction of uninformative pixels are rejected. Thus since clouds and coherent glints are not inherent features of a landscape imaged in natural IR or optical light (assuming this is the data modality for our atlas), any image where:

$$fTc+fTg>fcg\sim 40\text{-}60\% \quad\quad (eq.\ 3)$$

is classified as unusable, 4003, and we proceed to report a final result 4100 indicating a deficient GPP image (Iok=0). Next, regions containing water bodies can be informative but only if the image contains enough shoreline to be uniquely recognizable. Thus if fTn>fTw all the water pixels are kept but otherwise they are excluded from further processing and we require the same fraction of useable pixels as in eq. 3 namely:

$$fTc+fTg+fTw>fcg \quad\quad (eq.\ 4)$$

otherwise the matching process is terminated with Iok=0 (4003).

Amongst the remaining useable pixels, the fraction associated with the ground are:

$$fTgr=fTn+fTw \text{ (if water pixels are kept)} \quad\quad (eq.\ 5)$$

fTn (otherwise)

and we can decide in which textures for image matching to the atlas will be used. This is based on the relative fraction of pixels in shadow areas compared to the ground by forming the ratio:

$$fS=fTs/(fTgr+fTs) \quad\quad (eq.\ 6)$$

and using table 1 to decide which if any textures are useable.

TABLE 1

Relative shadow fraction and modality for matching

| fS | 0:0.15 | 0.15+:0.8− | 0.8:0.9 | 0.9+ |
|---|---|---|---|---|
| texture | ground | ground & shadow | shadow | none |

At the highest relative shadow fractions fS, there is substantially no information in the image and we terminate the process setting Iok=0 (4003). At the next highest range of fS, we exclude the ground pixels from further consideration and by using the known illumination geometry (radar, moon, sun, or other illumination source position at the time of image acquisition) we transform the orthographic atlas projection into an image as would be acquired under the same illumination conditions. Whether or not a natural illumination source 206 produces strong shadowing is determined by GPP processor 3001. The shadow portion of this atlas image is then matched to the shadow portion of the GPP image. This is the meaning of a shadow modality for image matching (more below). At the lowest range for fS, the shadow pixels are removed from any further consideration, the atlas image projected using the illumination geometry to match the illumination perspective, shadow pixels in the atlas image are eliminated from consideration and the resulting ground and atlas image section matched to one another. The intermediate case where both ground & shadow textures are utilized just means that we can (and probably do) utilize either the ground & shadow modalities or both for matching to the atlas. In addition to these considerations, we could choose to match only the identified water pixels to water pixels in the atlas image.

Next (7002.3), the GPP image acquisition and illumination geometry is acquired. Image acquisition geometry constitutes the nominal position of the GPP sensor 202 relative to the center, 205, of the imaged portion of the ground 203, the nominal position (present navigation solution) and (possibly) heading of platform 201, nominal image pixel size (angular or linear) and time (tk) or time interval of image capture among others. To determine the vector 202→205, we typically rely on the nominal platform position & heading, the measured altitude above ground and the pointing direction of imager 202 as determined by a mechanical gimbal or in the case of SAR, possibly by the antenna phasing commands. If this is insufficiently accurate, multiple (2 or more) spatially overlapping images can be taken and from that, the image acquisition geometry can be more accurately deduced. Also in the case of LIDAR or SAR, since image acquisition time can be ~1 min, the exact beginning & end of the illumination cycle is recorded with the midpoint being used for tk. Illumination geometry for SAR or LIDAR is the same as image acquisition geometry. For naturally lit scenery, illumination geometry is set by the solar or lunar position which is most conveniently taken from an appropriate digital ephemeris that takes time tk and the nominal platform position as inputs and produces the required astronomical position.

Next, 7002.4, the uncertainty in the position of the GPP image is determined by examining the discrepancies between the history of the stored navigational and subsystem solutions (5002) and their prior discrepancies with GPP determined positions. If P(tk,l)=position (latitude or longitude) as determined by sensor system/subsystem 1 (=INS, GPS, radio navigation, dead reckoning, GPP, complete navigation solution, etc.) at time tk, then we look at the difference in this position with that determined at a previous time, tk−1, getting:

$$\Delta P(tk,l)=P(tk,l)-P(tk-1,l) \quad \text{(eq. 7)}$$

Here tk−1 is the time at which the last GPP position was determined and we form the difference to eliminate any long term drifts (this is especially useful for INS and spoofed GPS systems). The time difference between GPP updates, tk−tk−1 is typically >~10 min but could be ~1 min. The estimated position of the GPP image at time tk is then:

$$P(tk,\text{GPP})=P(tk-1,\text{GPP})+\Delta P(tk) \quad \text{(eq. 8)}$$

Where ΔP(tk) is the average of the eq. 7 contribution subsystems other than GPP weighted (weight=wl) by their status (0/1 for no good/OK) and estimated (possibly from a navigational subsystem Kalman filter) variances (wl=iok(l)/σl²). The uncertainty in ΔP(tk) then sets the size of an initial search window to ~3 times the estimated standard deviation:

$$\sigma_{\Delta P(tk)}=1/(w1+w2+\ldots+wn)^{1/2} \quad \text{(eq. 9)}$$

Above discussion determines only the positional uncertainty of the GPP image. This is the most common case. However, the rotation, scale, differential scale, or shear of the image may be sufficiently uncertain that it too requires determination by matching to an atlas image. In these cases, the variation of the nominal image acquisition geometry from the actual image acquisition as determined by previous GPP image matches and stored in the GPP solution within the solutions records 5002, is used to estimate these uncertainties.

Next, 7002.4, we determine an uncertainty in one or more of position, rotation, shear, scale, differential scale or other higher order spatial distortion mode of the GPP image acquired by GPP sensor 202. We have already discussed (see above, eqs. 7, 8, 9) the determination of uncertainty in position (longitude, latitude) and it's relation to search window size. Because the various navigation results typically supply not only a position but also a heading or direction of travel, we can use the same considerations as above to compute the rotation uncertainty and thus the size of the search window for the rotation parameter. For the other positional modes (all but position and rotation), and this includes other 1st order modes (e.g. scale) and further higher order spatial distortion, we can reference the history of values as kept by the GPP portion of the solution records, 5002, extracting the value for a particular mode, q, as determined in all previous instances in the flight plan, qj, j=1:k−1. With this sequence in hand, the window of values for the value of mode q is most simply taken as a multiple (~3) of the standard deviation of q, σkq, as estimated from these values. While a single step recursive Kalman filter could be used to get σkq, we could also update weights, wqj, j=1:k−1, and estimate σkq (σkq ^):

$$qk\hat{}=\Sigma_{k=1:k-1}wqj*qj/\Sigma_{k=1:k-1}wqj \quad \text{(eq. 10)}$$

$$\sigma kq\hat{}=\text{sqrt}(\Sigma_{k=1:k-1}wqj*(qj-qk\hat{})^2/\Sigma_{k=1:k-1}wqj) \quad \text{(eq. 11)}$$

To limit the computation time for matching statistics, we may down sample the GPP image (7002.5) by keeping only 1 out of every n (>=2) pixels in the image we subsequently match to the atlas. This discrete down sampling also automatically preserves the texture and keep/exclude status previously determined and does not blur the image. Other, smoother down sampling schemes that rely on averaging are acceptable provided regions of predominantly excluded pixels become excluded pixels in the resampled image and regions containing a lower density of excluded pixels do not in any way pass through to the resampled image the amplitude values on the excluded pixels. Furthermore, and to make sense, the previous texture classification cannot be so discontinuous that a significant fraction (>10%) of the resampled pixels come from areas where the resampled texture index is derived without a predominance of one texture over all the others in the parent classification.

As described in 61/644,255, the image is now portioned into sub regions (7002.6).

At this point, we acquire and preprocess the atlas image, 7003. The reference atlas is stored on reference atlas disk 6101 and based on the nominal platform location at time tk (eq. 8), the extent (pixels across*size of each pixel), and uncertainties (eq. 9 & 11) in the GPP metadata, a section of the atlas centered on the nominal platform location and with extents determined by GPP image size and uncertainties is selected from the atlas. This information takes the form of an orthorectified array of intensities, Ia(ie=1:ne, in=1:nn), with directions typically aligned in the east/north direction and known pixel sizes and location. In addition, the atlas could also provide a digital elevation map (DEM) of the terrain consisting of an array ha(ie'=1:ne',in'=1:nn') of elevations above a reference geoid or other known, suitable surface (e.g. mean sea level) with pixel spacing generally greater than for the intensity array. In addition, the atlas may also classify whether a pixel is a water body or not and this information is also retrieved from the atlas in the form of an array wa(ie"=1:ne",in"=1:nn")=0/1 specifying whether a pixel is water/land. From the previously determined image capture or acquisition geometry (7002.3), the intensity array, Ia, is projected to the same geometry. So for example, if GPP sensor 202 is a SAR, Ia is projected to the slant plane, while if 202 is an optical camera, Ia is projected according the camera model suitable to 202 (an unspecified camera model would default to a pinhole camera model). Simultaneously, the intensity is resampled or interpolated to the same pixel spacing as the down sampled GPP image. If provided, the atlas texture array (wa) and height arrays (ha) are similarly resampled and projected according to the GPP image acquisition geometry. If the atlas intensity is a color image, we can use one or more or combinations of the red, green, blue images for matching.

Now, and as described above, the resampled and projected atlas image may be used as is or the pixels subjected to the same pixel textures or classifications as the GPP image. So for example, using a SAR or LIDAR GPP sensor 202, an optical atlas image would have pixels classified according to whether they are in the radar shadow of GPP sensor 202 or not. For this, the atlas must provide a DEM array ha which is used in this shadow computation the result of which is a two valued array, Isa, defining whether an atlas pixel is in a shadow or not. Similarly, optical GPP imagery likely to exhibit strong shadows such as that obtained at low light levels from a directional source (e.g. low altitude moonshine) would also necessitate computation of an atlas image shadow array, Isa. Whether strong shadows are present or not is a decision that can be automatically made by GPP processor 3001 by examining the statistics of the GPP image as explained in 61/644,255. At this point, 7003.2, based on the texture classifications of GPP and atlas images there may be more than a single image pair from which we derive a ground point position. Thus we could compare an image derived from the GPP image using only the shadow pixels (pixels in shadow set to intensity=1, none of the other pixels considered in the matching calculation) to a similar image derived from the atlas where the pixels computed as being in the shadow have intensities set=1 and all of the other pixels are not considered in the matching calculation. Similarly, we could compare an image derived from the GPP image using only the ground pixels (pixels identified as coming from the ground remain at their measured intensity and none of the other pixels are considered in the matching calculation) to a similar image derived from the atlas where the pixels computed as being from a ground retain their intensities and all of the other pixels are not considered in the matching calculation. Another possibility for image matching relies on the water texture as determined by whether a pixel in the GPP image represents a return from contiguous bodies of water and matches it to a transformed atlas image utilizing the water texture as provided by the atlas to binarize the atlas image utilizing only pixels representing water bodies. Other textures besides ground, water and shadow could be utilized to arrive at image pairs for subsequent matching. So at this point, we have one or more preprocessed GPP sensor images classified by a texture or combination of textures and one or more atlas images preprocessed to a projection, orientation, and texture(s) nominally matching the preprocessed GPP image and oversized to account for the anticipated uncertainty in GPP position and other higher order spatial distortion modes.

Figure 6:
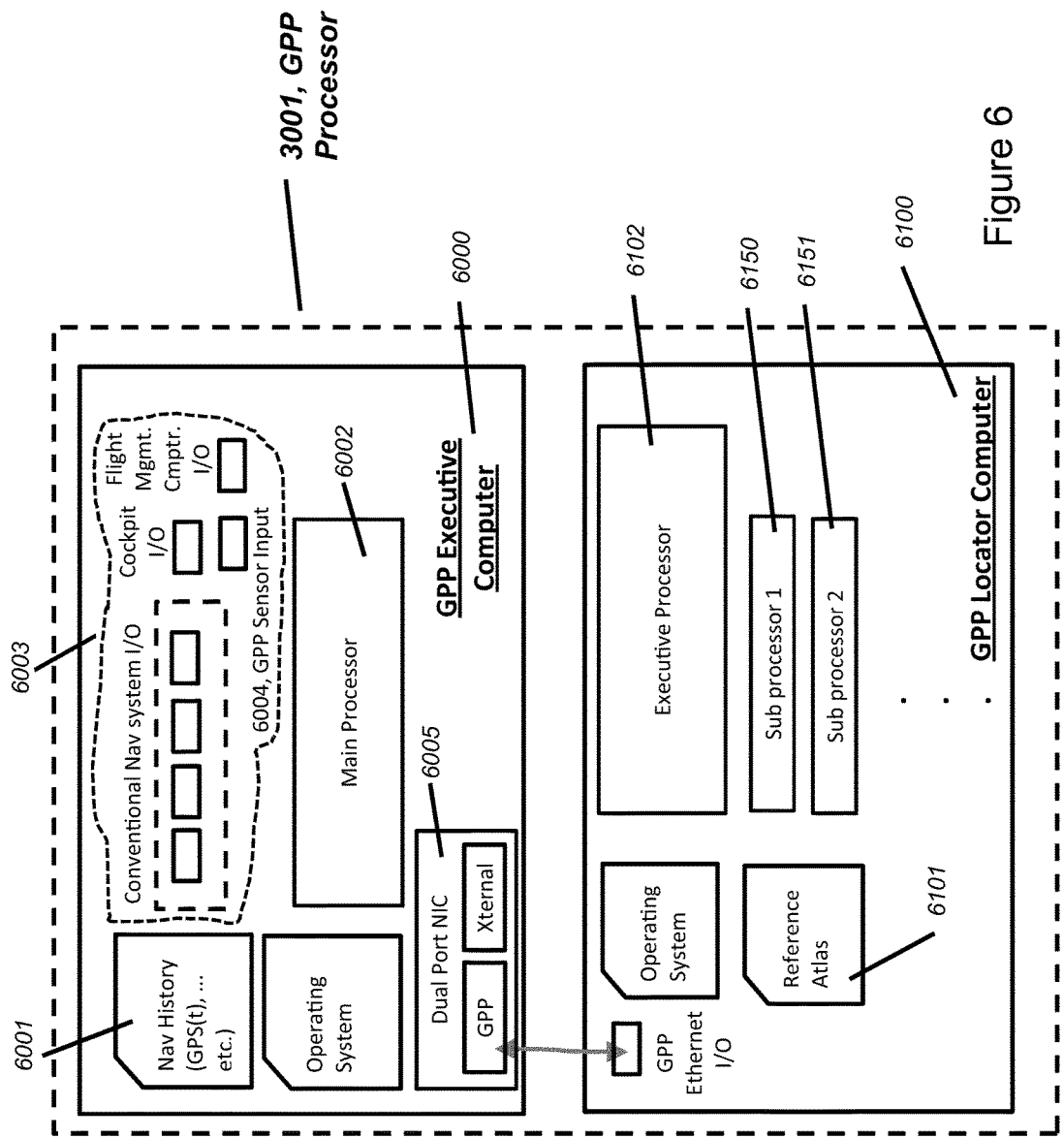
FIG. 6 is a block diagram of one hardware implementation of a GPP processor, according to one embodiment.

Now, 7004, for each image pair deemed suitable for comparison, we compute the location and possibly other higher order spatial modes of the preprocessed GPP image relative to the preprocessed atlas image. As described in 61/644,255, the exact algorithm used could be dependent on the image texture (water treated same as shadow, both treated different from ground) and other critical details. Additionally, simpler algorithms can be used if only position and no higher order spatial distortions need to be extracted. As described in 61/644,255, the calculation of matching statistics for each sub region (7002.6) is typically carried out as a parallel computation process, 4001. FIG. 6 is a block diagram of GPP processor 3001 wherein GPP locator computer 6100 is tasked with carrying out the image matching calculations. Executive processor 6101 carries out the GPP & atlas preprocessing steps while numerous sub processors 6150, 6151, . . . carry out sub region matching statistic calculations in parallel. Sub processors 615x could contain or consist of PCI cards implementing FFT's on field programmable gate arrays (FPGA). Once the matching statistics for each sub region are computed, the GPP image position and possibly higher order spatial mode parameters are calculated as well as their uncertainty and on overall status bit, Iloc=1/0 set designating whether GPP image was/was not located. All this is done in accordance with 61/644,255. Failure to locate (Iloc=0) generally means we must increase the size of the atlas image region we are matching over and in this case all of the previously computed matching statistics are saved. Next, a larger section of the stored atlas is retrieved and preprocessed, 7003. Now rather than repeat all of the matching statistic calculations for each sub region, we do so only over the incrementally new sections of the preprocessed atlas image along with some inevitable overlapping regions. This saving of matching statistics & subsequent partial processing of the updated atlas image speeds the computation. If more than one texture is available for matching, we typically carry out the matching calculation, 7004, for a first image and if at the conclusion we locate it (Iloc=1), the calculated position and other spatial modes are used to trim the search area of a second like textured pair to see if it confirms the position and other parameters determined from the first pair. This provides a check and improves estimates of both the position and uncertainty of position. Failing a match, the second textured pair has its search area increased to encompass that originally present in the preprocessed atlas image. This is all illustrated by FIG. 8. Other schemes along these lines for reconciling the positions and higher order spatial modes as determined by multiple textured image pairs are clearly possible.

At this point, 4100, if we have one or more useable textured images (Iok=1 or Yes), that we can successfully locate relative to the atlas and to one another (Iloc=1 or Yes), we can compute one or more of position and higher order image distortion parameters of the GPP image relative to the atlas image as well as an uncertainty (typically expressed as a standard deviation, $\sigma$) in each parameter. If refined positional accuracy is required, we can preprocess the GPP image without any down sampling, preprocess the atlas image centering it on the just computed position and with a size enlarged by the calculated uncertainty in the position or +/−5*initial pixel size (whichever is greater) and then repeat the matching statistic calculations. So the position (& possibly higher order distortion information) along with the effective time (tk) of GPP image acquisition is forwarded to the GPP portion of the navigation solutions record 5002 which is physically stored in GPP executive computer 6000 on disk or long term storage media 6001. The navigation solution, 3102, which is the primary output of flight navigation system 3200 and used for determining progress of the flight plan and corrections to aircraft heading is now critiqued by GPP processor 3001. Offsets in absolute position (longitude, latitude):

$$\delta P(tk,\text{Nav})=P(tk,\text{Nav})-P(tk,\text{GPP}) \quad \text{(eq. 12)}$$

above a specified level that can be determined by the measured uncertainty in P(tk,GPP) and the presumed or possibly flight computer provided (from an internal Kalman filter) estimate of uncertainty in P(tk,Nav), compel GPP processor 3001 to flag the overall navigation solution 3102 as malfunctioning. GPP processor 3001 then sets the iok_Nav bit to 0 (mal functioning), provides the error as computed at time tk (eq 12), as well as the uncertainty in $\delta$P(tk,Nav), $\delta$Nay. This critique, 3002, is then provided to flight computer 3101, which can then reset the platform position based on the provided offset (eq 12). This is the simplest use of the GPP image location. We can also diagnose navigational subsystems. The GPS subsystem 3102 itself produces a solution and we can analyze it in exactly the same way we did the overall navigation solution and provide a critique 3003 to flight navigation computer 3102. For the INS system, because of its large drifts over extended (>~1 hr) time periods, we look at the difference between positions from the last GPP update. For looking at differences in position at 2 different GPP update times tk, tk−1 we consider:

$$\delta P(tk,\text{INS})=P(tk,\text{INS})-P(tk-1,\text{INS})-P(tk,\text{GPP})-P(tk-1,\text{GPP}) \quad \text{(eq. 13)}$$

Figure 1:
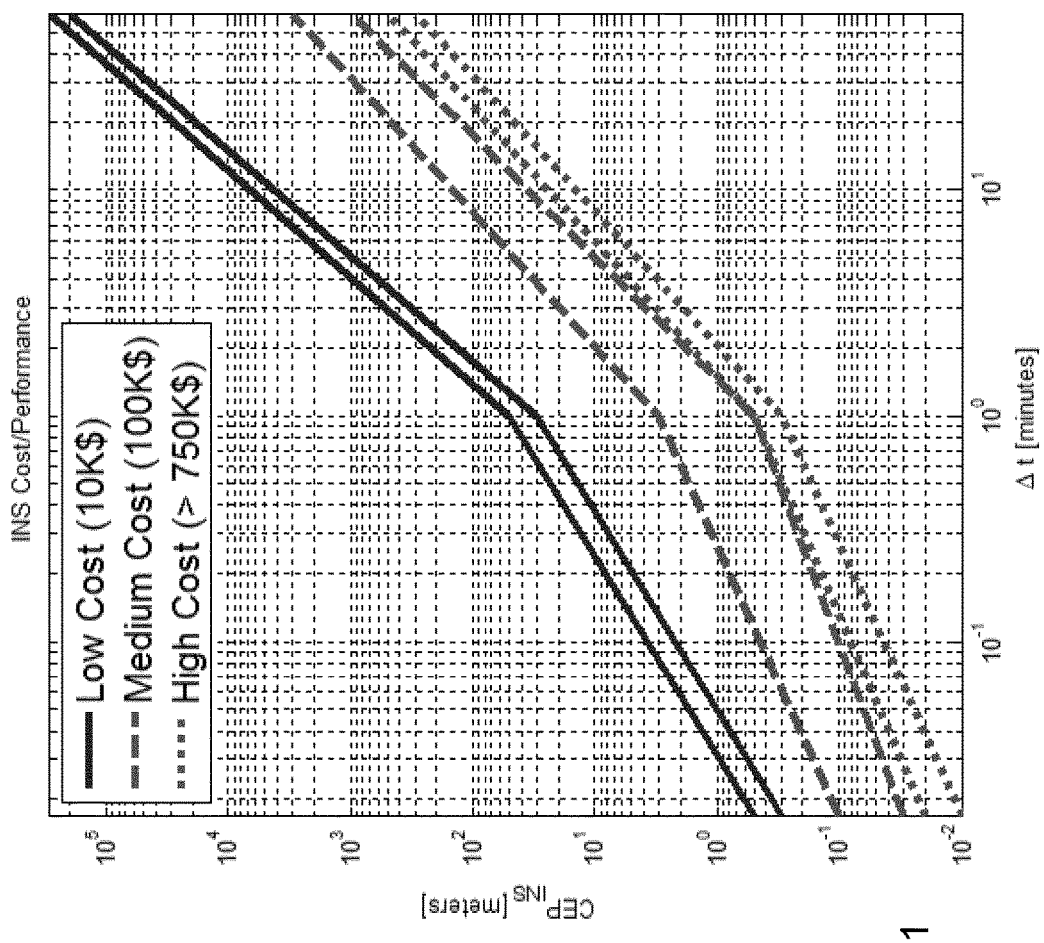
FIG. 1 is a graph illustrating INS accuracy, according to one embodiment.

Then from the known or presumed error in the INS system over time interval tk−tk−1 (FIG. 1), or analysis of INS solutions obtained from solution records 5002 we can estimate the uncertainty in P(tk,INS)−P(tk−1,INS) and since the GPP solutions obtained from solution records 5002 also contain uncertainties, we know the statistical limits of $\delta$P(tk, INS) (typically characterized by a standard deviation $\sigma$(tk, INS)). So based on the known statistics of $\delta$P(tk,INS) and its actual value (eq. 13) we can directly assess whether the INS system is functioning within acceptable bounds (iok_INS=1) or not (iok_INS=0). As above, we convey our critique consisting of tk, iok_INS, $\delta$P(tk,INS), $\sigma$(tk,INS) (3004) to flight computer 3101. Based on the iok_INS bit and possibly other parameters, the flight computer can switch off the INS contribution to its internal filter or whatever other means it uses to determine overall navigation solution 3102. In like manner, and depending on whether we expect absolute positional accuracy over all time (GPS, Radio navigation, overall navigation solution, etc.) or merely constrained accuracy over shorter times (INS, dead reckoning using air data computer, ground speed indicator and magnetometer, etc.) by providing statistically accurate critiques for each navigational subsystem and partial or total navigational solutions, flight computer 3101 can remove non-functioning subsystems from the overall navigation solution 3102 and reset the entire navigation system to the known location provided by the GPP sensor.

Having detailed a method for precise waypoint updating using a GPP sensor we now discuss some system & hardware aspects of the disclosure.

Figure 3:
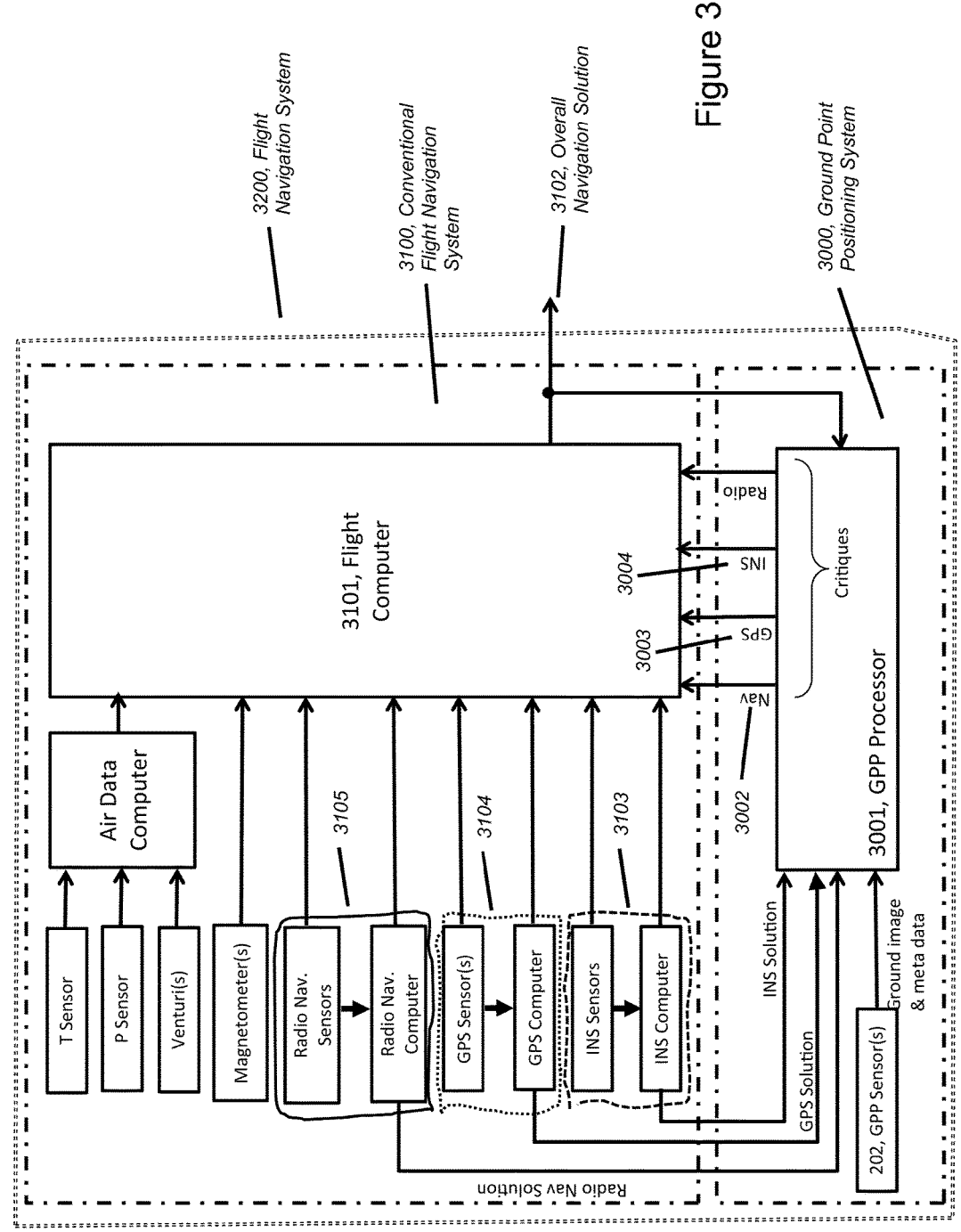
FIG. 3 is a block diagram of a flight navigation system and ground point positioning system, according to one embodiment.

FIG. 3 illustrates a conventional flight navigation system 3100 integrated with a ground point positioning system 3000 forming the flight navigation system 3200 of this disclosure. Outputs of the INS subsystem 3103, radio navigation subsystem 3105, and other navigational subsystems are typically deeply integrated with outputs of the GPS subsystem 3104 within flight computer 3101 resulting in an overall navigational solution 3102. These navigational subsystem and total navigational solutions are also provided to GPP processor 3001 and archived for future use. A GPP sensor 202 such as an optical or infrared camera or active imaging devices such as SAR, LIDAR, or mm wave image uploads an image of the ground and meta data connected with the image to processor 3001 where they are archived. GPP processor 3001 then locates the image relative to an internally stored atlas of ground images and produces critiques 3002, 3003, 3004, . . . of the navigational system and subsystems that are provided to flight computer 3101. An IOK bit designating whether the system or subsystem is functioning correctly or not is part each critique and can be used by 3101 to enable or disable the contribution of a subsystem to the overall navigational solution. Additionally, the critiques contain the absolute error of the overall navigational system solution (3102) which can be used to reset the navigation solution to a good known position.

Figure 4:
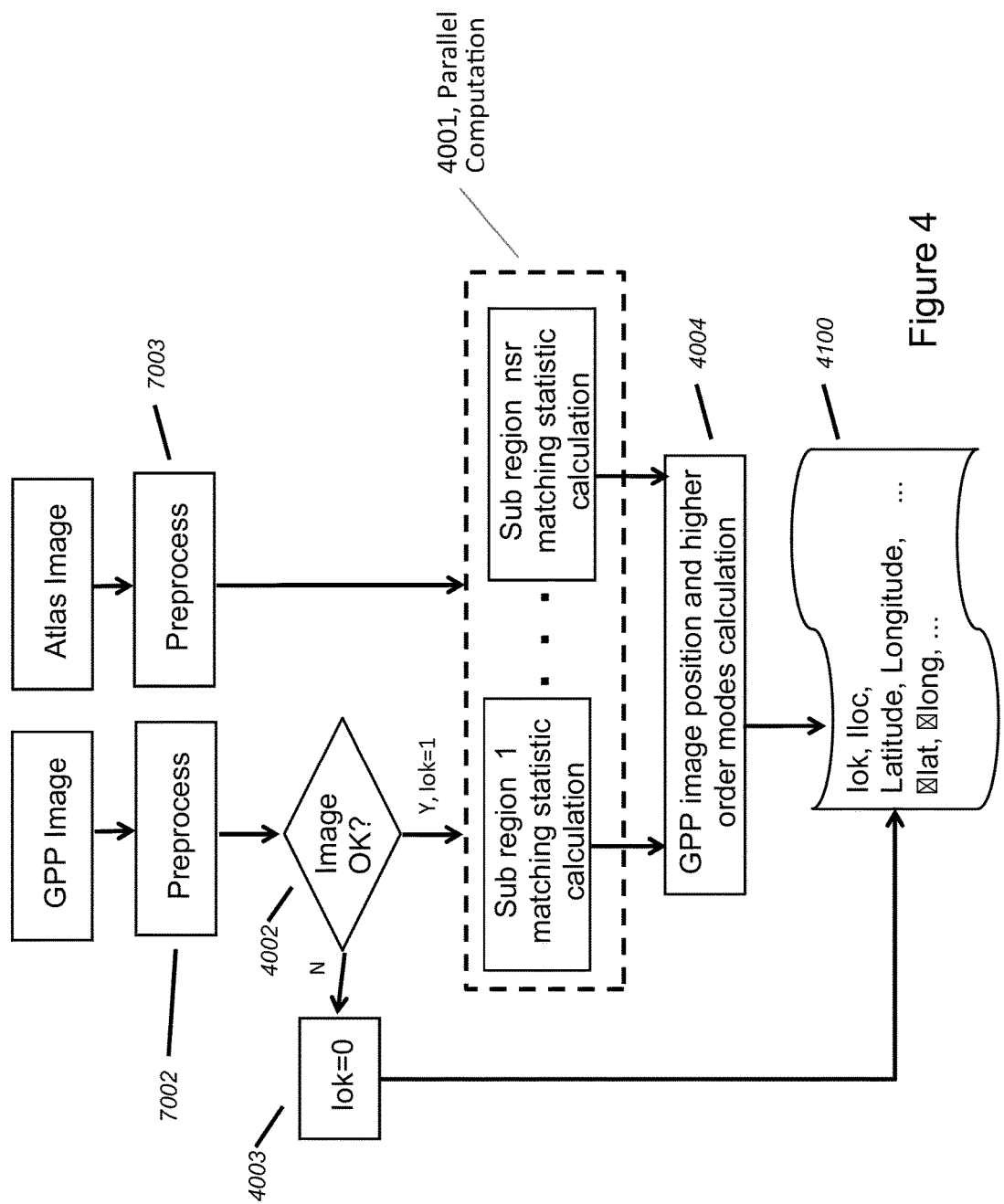
FIG. 4 is a flow diagram of a process for referencing a ground point positioning (GPP) image to an atlas image, according to another embodiment.
Figure 8:
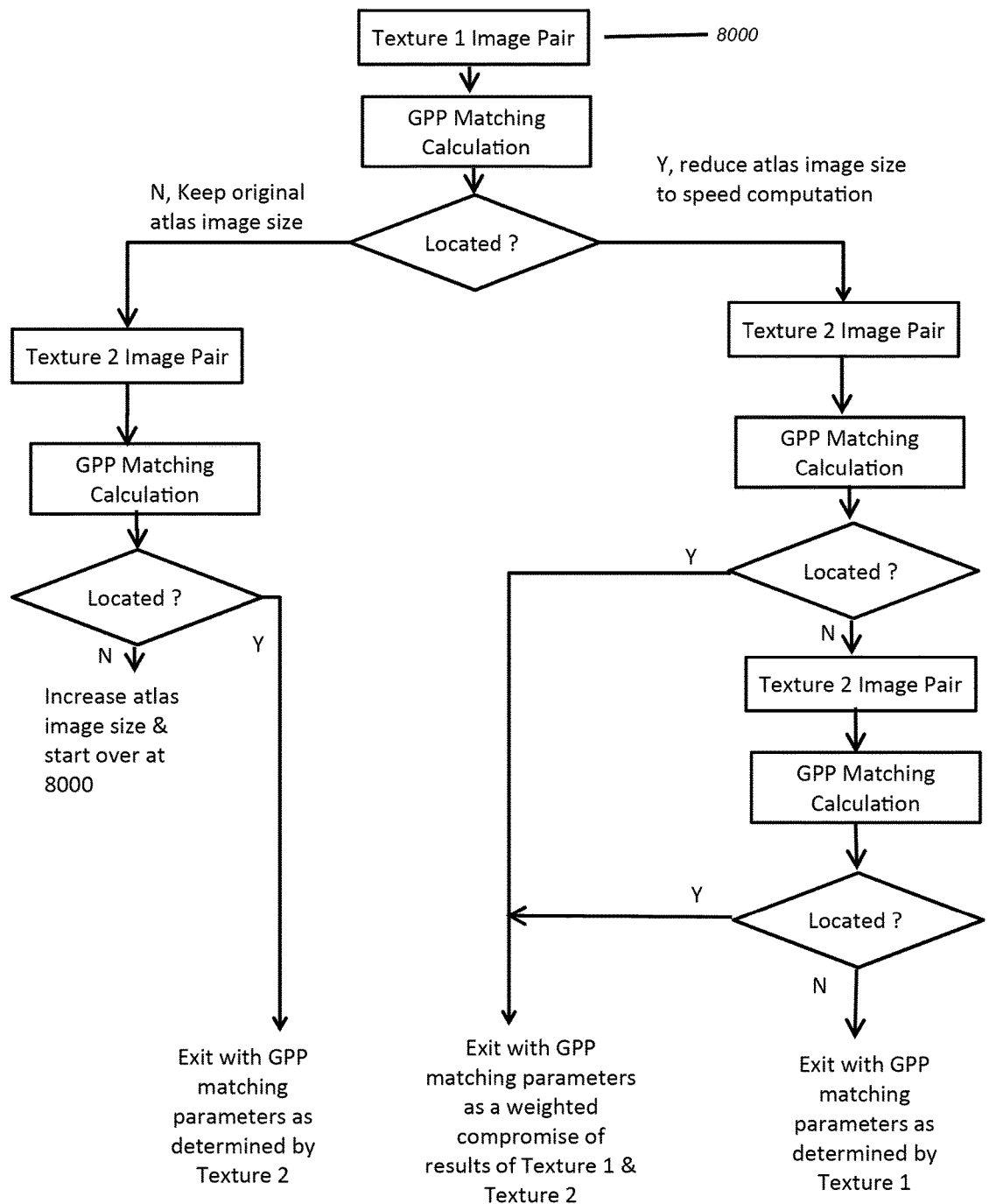
FIG. 8 is a flow diagram of a process for determining matching statistics/parameters with two textured images, according to one embodiment.

FIG. 4 illustrates the process and computational flow for referencing a GPP image to an atlas image. The GPP image is preprocessed and textures are possibly extracted. Additionally, there are various tests for determining whether it is suitable for an attempted match to an atlas image (Iok bit 4003). Based on the GPP image and the uncertainty in its position and possibly other higher order spatial modes, a section of the atlas is carved out and preprocessed, extracting textures and projecting it to the same image acquisition geometry used by the GPP image. Parallel computation, 4001, to calculate matching statistics takes place for each sub region determined in the preprocessing step, 7002. Based on the matching statistics computed for each sub region, we determine whether the image has been matched at all or not (Iloc bit) and if so the values of the position of the preprocessed GPP image relative to the preprocessed atlas image. This is repeated if there is more than one useable texture or sub texture present in the GPP image. FIG. 8 outlines the logic for efficiently handling GPP images for which more than 1 texture is present. The result of this GPP matching process is flags specifying whether the imagery was suitable for a matching attempt at all (Iok), whether we were able to successfully match to a portion of the atlas (Iloc), values of position and higher order spatial distortion parameters, and uncertainty in position and higher order spatial parameters (4100).

FIG. 5 shows an information flow diagram of a single texture case for generation of navigational solution critiques. Overall navigation solution and navigation subsystem solutions, 5001, are separately stored within solution records 5002. The various navigation solutions are saved at their natural update rate which is typically anywhere from 0.01-2 Hz. Once a GPP image is located in the atlas, this GPP solution is updated and other navigation solutions are critiqued relative to it. Navigational critiques include among other quantities, time, ok/no good bit, measured deviation, estimated error in the measured deviation & estimate of how long the navigational system or subsystem has been malfunctioning. GPP sensor data and meta data (5004) are also stored in the GPP solutions record along with any GPP solution we subsequently arrive at.

FIG. 6 is a block diagram of one hardware implementation of GPP processor 3001. GPP executive computer 6000 is responsible for communicating with the aircraft platform subsystems through input/output (I/O) ports 6003 amongst which are I/O with the conventional navigation system 3100 which possibly includes shared and separate I/O for the flight computer 3101, radio navigation subsystem 3105, GPS subsystem 3104 and INS subsystem 3103. Additionally, GPS sensor 202 has I/O port 6004, as well as additional I/O ports for 2-way communication with the cockpit console and the flight management computer. Main processor 6002 is responsible for caching navigational solutions produced by navigational subsystems 3103, 3104, etc., the overall navigational solution 3102, as well as the GPP solution 4100 into storage disk 6100 that is the physical archive for solution records 5002. GPP locator computer 6100 communicates with GPP executive computer 6000 through dual (or multi) port network interface card 6005. It may communicate with other aircraft networks but it is anticipated that this would occur only in a maintenance mode of operation and not be enabled during active flight. By dividing the processor architecture we enable low/latency fast response to external I/O with low interruption to the processor (6100) responsible for the high operation count image matching or locating function.

Within 6100, storage 6101 for the reference atlas is provided. Amount of storage is determined by type of platform and its scope of use. For a regional jet, a moderate resolution & accuracy atlas (4 [m] pixels, 0.5 [m] accuracy, 1 byte/pixel) covering CONUS & compressed 50% requires ~250 [Gigabyte] storage. A long haul commercial jetliner might also carry a moderate resolution/accuracy atlas covering the entire world's land mass [4.7 Terabyte @ 50% compression]. A military aircraft might carry a 4 [m] worldwide map and a high resolution map covering its theatre of operation. A high resolution/accuracy atlas (1 [m] pixel/0.1 [m] accuracy) covering CONUS needs 3.8 [Terabyte] so a military aircraft might need as much as 8.5 [Terabytes] storage. On a munition, an atlas section could be uploaded just prior to launch, 50×500 [km^2] area at high resolution/accuracy requires 13 gigabytes of storage. Alternatively, in a conflict zone, munitions could have their local atlases updated at periodic intervals (~1-3 min) to cover the land within 100 km of the platform (16 [Gigabyte]) so that just prior to launch less atlas data needs transferring. Executive processor 6102 is responsible for preprocessing the GPP and atlas images, coordinating operation of sub processors 6150, 6151, ... which compute sub region matching statistics, and computing the final GPP status, location, and uncertainty information 4100.

Ground Version

Figure 10:
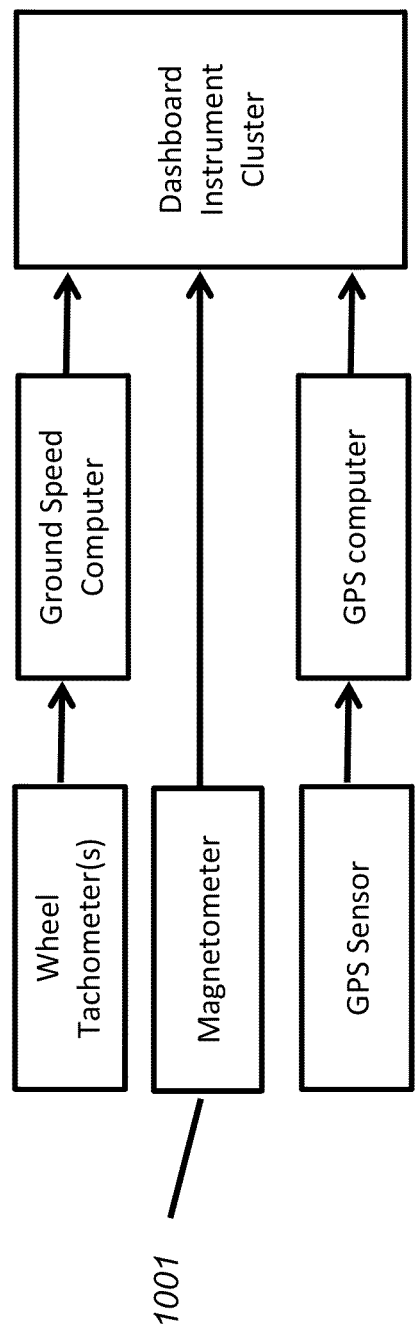
FIG. 10 is a block diagram of an uncoupled ground navigation system, according to one embodiment.
Figure 11:
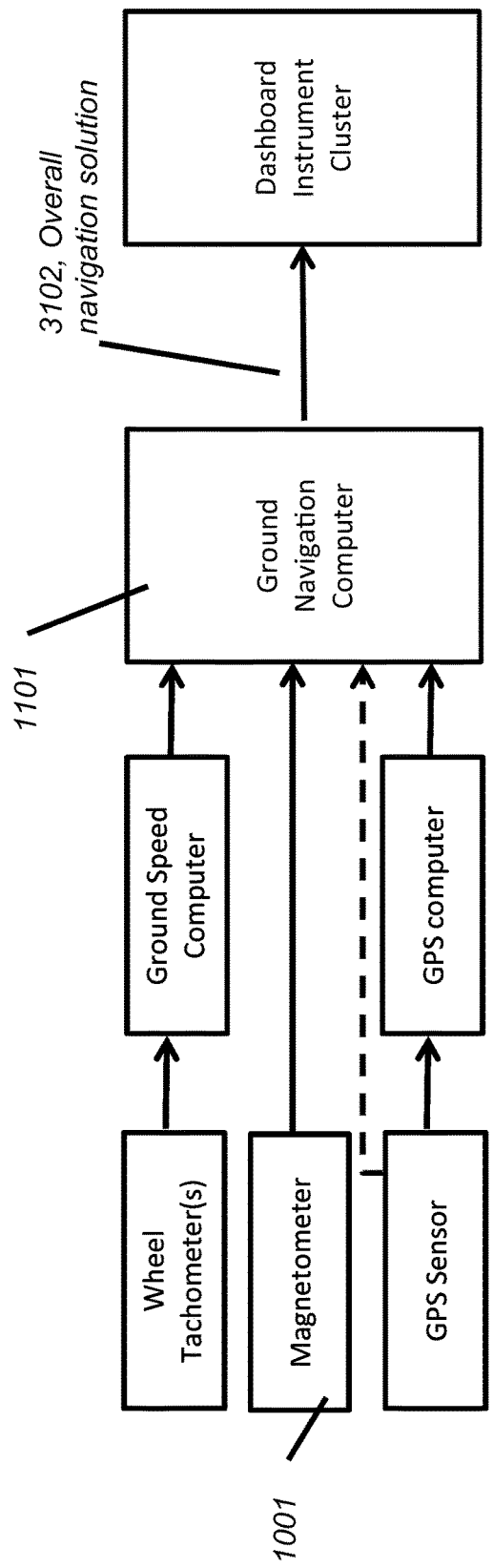
FIG. 11 is a block diagram of a coupled ground navigation system, according to one embodiment.

FIG. 10 outlines a typical, uncoupled ground navigation system with independent subsystems (speed, direction, GPS) providing their outputs to the dashboard instrument cluster. Magnetometer 1001 is typically a single axis digital compass. A coupled ground navigation system, FIG. 11, combines these various outputs, possibly using a Kalman filter with modal logic providing the flexibility to eliminate inputs from non-functioning subsystems. Magnetometer 1001, could measure multiple axes. The GPS sensor could directly provide input to ground navigation computer 1101, combining it the magnetometer and ground speed information in an Kalman filter to produce an enhanced, overall navigation solution 3102. Neither system illustrated by FIG. 10 or 11 can provide accurate positional information in the absence of GPS caused by active jamming or sufficient obstruction in the line of sight to GPS satellites.

Figure 12:
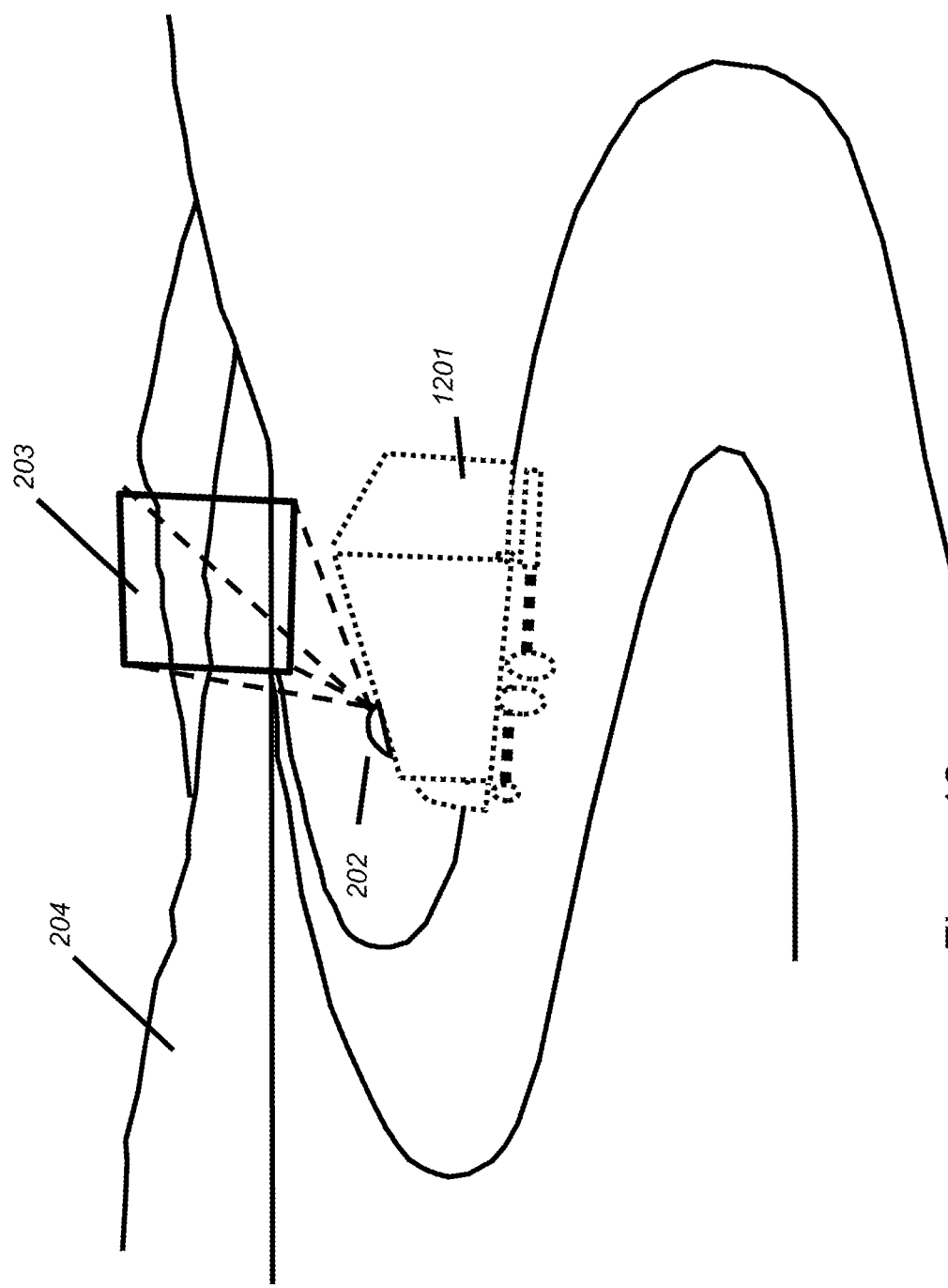
FIG. 12 is an illustration of a ground vehicle collecting ground image data, according to one embodiment.

FIG. 12 illustrates the ground version of this disclosure in operation. Ground moving platform 1201 has mounted on it GPP sensor(s) (typically an optical &/or IR cameras) 202 that image portions (203) of a landscape scene 204. GPP sensor 202 typically consists of one or more cameras configured to image a wide landscape panorama, possibly 360°. In situations where platform mounted sensor 202 is damaged or otherwise non-functional, a handheld camera could be used as the GPP sensor. For seamless operation, the handheld camera would be equipped with built in orientation sensors (typically magnetometers integrated with MEMS accelerometers) and a dynamic camera model (a nominal one that models effect of zoom and focus on distortion) the results of which are attached to each image (along with a timestamp). For instance, an image in the standard .png (Portable Network Graphics) format in addition to the photographic imagery could have this meta data (measured camera orientation, the camera distortion parameters for the particular focus and zoom setting used, date & time stamp) packaged in the tEXt field. GPP processor, 3001, would also have a protocol and physical interconnection (such as a memory card reader, USB port, wireless access port, etc.) for loading such externally generated imagery.

Figure 13:
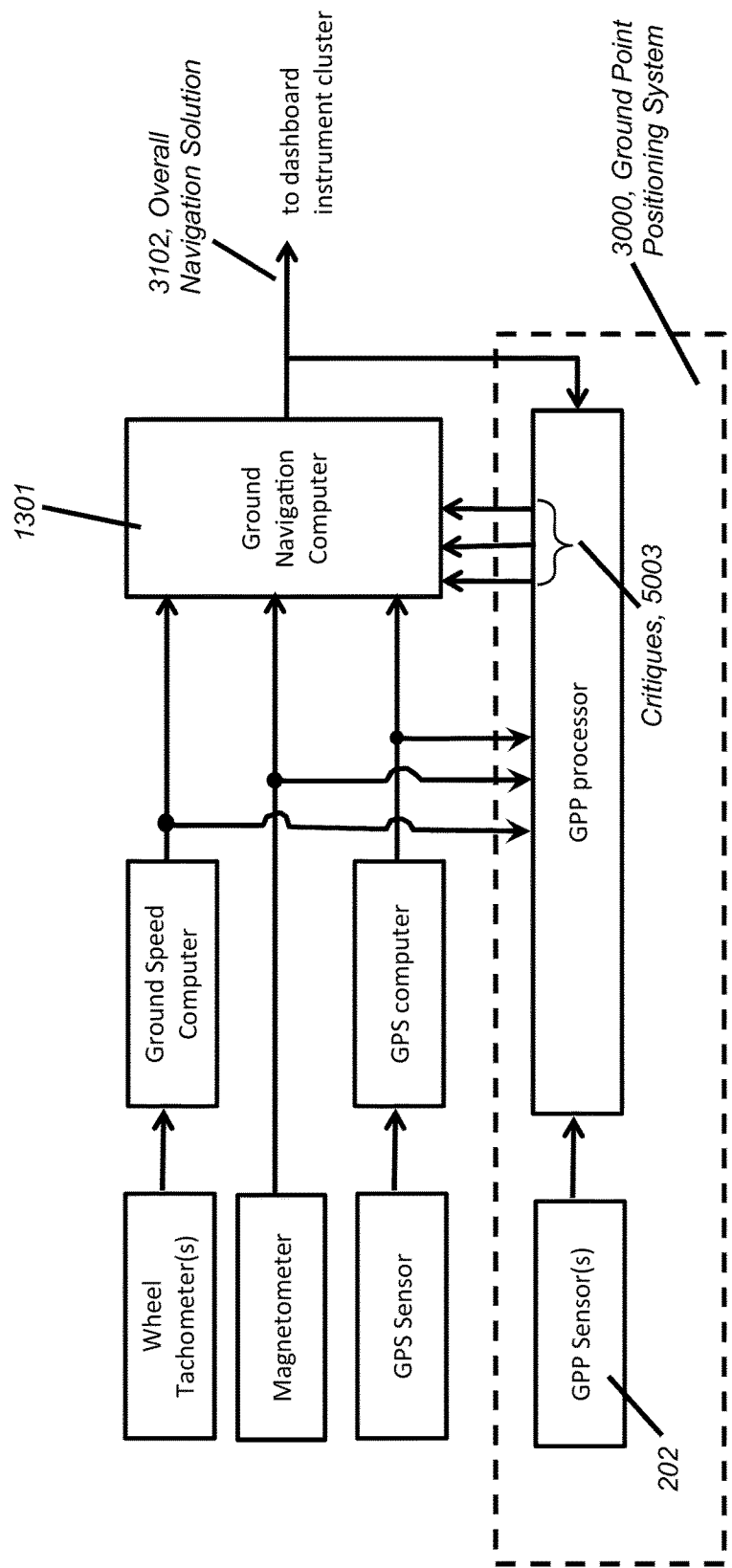
FIG. 13 is a block diagram of a GPP system integrated with a ground navigation computer, according to one embodiment.

FIG. 13 illustrates a GPP system 3000 integrated with a ground navigation system and ground navigation computer 1301. GPP processor 3001 receives outputs of various ground navigational subsystems & nay solution as well as images from GPP sensor(s) 202. As before, it computes its position based on GPP images through comparison with an internal atlas and based on this and the stored time history of navigational results sends periodic critiques, 5003 to ground navigation computer 1301. The biggest differences between the aerial and ground case occur in the preprocessing stages for the GPP image (7002) and the atlas image (7003). After the ground texture, sky is the next most commonly encountered. Its ubiquity, uniformity and known presence at high enough angle above the horizon simplify identifying it within GPP images. As a texture, we can match skylines to atlas generated skylines. If, as previously described, the atlas contains orthorectified ground imagery along with a DEM we can project the atlas image to the GPP perspective taking into account the obscuration of more distant background objects from closer foreground objects. For vertically, or near vertically oriented object planes 203, position (latitude, longitude) is most directly correlated with the first order scale (s) & to some extent asymmetric scale (as) parameter so in the simplest case, we would minimize:

$$\Sigma_{x,y}(Icam(x,y)-Iatlas(x^*(1+s+as),y^*(1+s-as)))^2 \qquad \text{(eq. 14)}$$

with respect to s & as. More generally, we would include distortions up to $2^{nd}$ (12 parameters) or $3^{rd}$ (20 parameters) order in x & y. The crucial details of how these calculations are carried out are in ref 1 (incorporated by reference).

The atlas carried in a ground version of this disclosure could most simply carry a single orthophoto covering an area equivalent to CONUS (3.8 [TeraByte] with 50% compression) but would preferably carry a set of off-axis perspectives (45° altitude) from 4 distinct directions (north, south, east, west) so that the atlas perspective most closely matching the ground vehicle (1201) perspective would then be transformed to the ground vehicle perspective.

Additional Aspects

If conventional navigation system 3100 uses a star tracker for day (sun, moon, planets & a few stars are tracked) and/or night time celestial navigation, then, as described above, we can critique its navigation solution. If the star tracker only provides a heading (direction of aircraft nose), it can be critiqued by examining the relative orientation (rotation) of the GPP image.

More than a single GPP sensor can be deployed on the platform. For instance, near simultaneous images from two or more cameras each imaging a separate (possibly overlapping) portion of the ground can be used to very accurately determine platform orientation and range as well as providing a higher quality overall result.

In another aspect of this invention, GPP system 3000 is self-checking. For every GPP image, 2 binary decisions are made regarding their suitability for use at all (Iok) and whether we located (Iloc) the acquired image from an atlas section oversized relative to the image by a known amount (possibly oversized 2× or larger than the image). This immediate self-censoring helps maintain the integrity in the accumulation over time of position and higher order spatial parameters along with their uncertainties (σX).

Knowledge of which navigational subsystems are functioning correctly leads to more precise GPP image meta data that can increase accuracy while simultaneously decreasing matching statistic computation time. For example, accurate heading, track (direction of travel on ground), and groundspeed can be relayed to an effective fast gimbal (not shown) attached to GPP sensor 202 allowing for deblurring of an optical or IR photo caused by platform motion. In another example, platforms equipped with in-situ airframe flexure measurement systems (ref 21) can relay this information to GPP processor 3001 which then compensates for relative motion of GPP sensor 202 relative to the central INS sensor by altering the meta data used to process the GPP image.

In situations where navigation subsystems other than GPP are impaired, malfunctioning, or cannot otherwise be deployed (broadcast radar blackout for stealth), GPP system 3000 can provide complete navigational updates on a more frequent basis and more limited information on a still more frequent basis. Thus, for a known camera geometry (fixed focal length, zoom & focal plane position), we can utilize single GPP acquired images to compute platform 201's range from points on the ground, 205, by matching to the atlas image, solving for a scale factor distortion (δM) to get the range R:

$$R=dx\_atlas^*(1+\sigma M)/d\theta \qquad \text{(eq. 14)}$$

where:
dx_atlas=pixel size of atlas image
δM=scale factor distortion as determined by matching process
dθ=angular size of GPP sensor pixel, known from the camera model.

Other examples include:
  utilizing the rotation of the acquired photo relative to the atlas to determine platform heading.
  taking 2 or more photos that substantially overlap (~>20% of area) and using them to determine platform track, ground speed and orientation by comparing the photos amongst themselves, or, what is generally more precise, comparing them amongst themselves and with atlas images.

Figure 14:
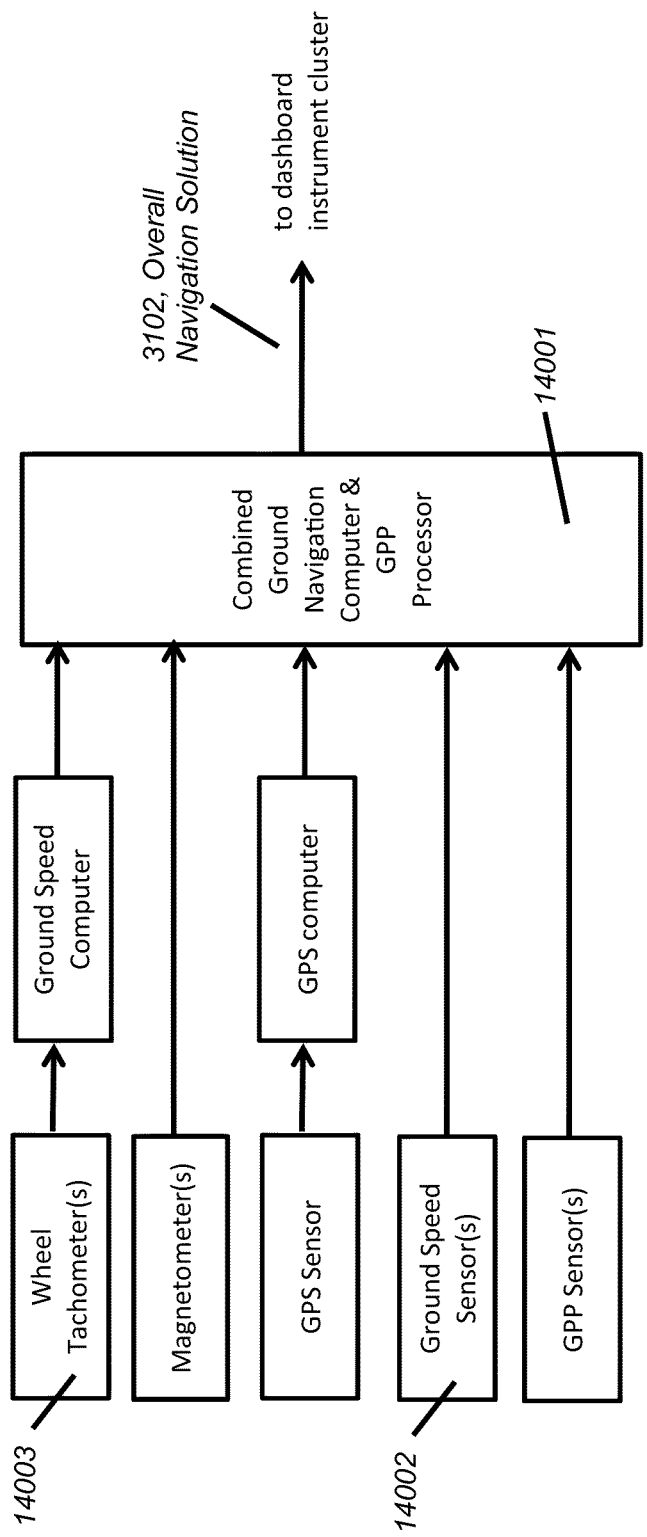
FIG. 14 is a block diagram of a ground navigation computer integrated into a GPP processor, according to one embodiment.

Another useful variant of the ground navigation system is shown in FIG. 14. There, the ground navigation computer and GPP processor have been combined into a single unit, 14001. Additional optical or radar ground speed indicators (14002) enhance dead reckoning accuracy by decreasing the error in speed indication by wheel tachometer(s) 14003.

In non-urban areas, the spacing of the DEM grid is typically much larger (typically a factor of 10) than the image atlas. In urban or steep terrain, a tighter DEM spacing can be provided.

The ability of a ground based GPP processor to utilize GPP sensor data from hand held remote cameras can be extended to allow individuals to remotely upload images & metadata, have the GPP processor determine & transmit their current location to them. Multiple individuals or groups can then access the same GPP processor to determine position in the absence of GPS.

While various embodiments discussed above are presented under separate headings, it should be understood that various features described with respect to one embodiment may be applied in the context of another embodiment. All combinations of features described with respect to the various embodiments presented herein are contemplated within the scope of the present disclosure.

It should be noted that the example processes shown herein are for example purposes only such that other processes may be used which fall within the spirit and scope of the present disclosure. As such, it should also be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code (i.e., computer readable medium). Accordingly, implementation may be with the processor(s)/processing circuit described above via, for example, one or more memory devices communicably coupled to the processor(s)/processing circuit.

The computer (also referred to herein as machine readable) readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A navigation system comprising:
   one or more navigation subsystems configured to determine a position of a platform;
   a first processor configured to receive one or more outputs of the one or more navigation subsystems and generate a navigation solution;
   a sensor configured to generate a ground image; and
   a second processor configured to:
   process the ground image into one or more of a plurality of textures to generate a processed ground image;
   determine an estimated location of the ground image;
   partition the processed ground image into a plurality of ground image sub regions;
   retrieve a reference image from an atlas of reference images, each reference image in the atlas having an associated accuracy, resolution, and projection, the reference image having a position, projection, and extent determined based on the estimated location and a ground image projection of the ground image;
   generate a plurality of matching statistics comprising a matching statistic for each ground image sub region by comparing the ground image sub region to a portion of the reference image;
   calculate a relative position of the ground image with respect to the reference image based on the matching statistics;
   determine critique data associated with at least one of the one or more navigation subsystems based on the relative position of the ground image with respect to the reference image and a position of the ground image determined using the at least one navigation subsystem, the critique data comprising at least one of an error or a status of the at least one navigation subsystem based on an analysis of the position of the ground image determined using the at least one navigation subsystem in view of the relative position of the ground image with respect to the reference image; and
   transmit the critique data to the first processor;
   wherein the first processor is further configured to adjust one or more parameters associated with the at least one navigation subsystem based on the critique data, the first processor configured to generate the navigation solution using the adjusted one or more parameters.

2. The navigation system of claim 1, the platform comprising an aircraft, the at least one navigation subsystem comprising a flight navigation system, the first processor comprising a flight computer, and the second processor comprising a ground point positioning processor.

3. The navigation system of claim 1, the platform comprising a ground-based vehicle, the at least one navigation subsystem comprising a ground navigation system, the first processor comprising a ground navigation computer, and the second processor comprising a ground point positioning processor.

4. The navigation system of claim 1, wherein the second processor is further configured to store a history of at least one of one or more navigation subsystem solutions associated with one or more of the navigation subsystems or a combined navigation solution generated using two or more navigation subsystems.

5. The navigation system of claim 1, wherein the second processor is further configured to determine whether the ground image is suitable for matching to the reference image.

6. The navigation system of claim 1, wherein the second processor is further configured to determine an estimated location error associated with the ground image.

7. The navigation system of claim 1, wherein the second processor is further configured to determine and apply a down sampling ratio to the ground image prior to partitioning the processed ground image.

8. The navigation system of claim 1, wherein the second processor is further configured to calculate an uncertainty in position of the ground image with respect to the reference image and determine the critique data based on the uncertainty in position.

9. The navigation system of claim 1, further comprising a link between the second processor and the first processor through which the second processor transmits the critique data to the first processor.

10. A navigation system comprising:
    a processor configured to:
    store a history of navigation solutions associated with one or more navigation subsystems configured to determine a position of a platform;
    acquire a ground image from a sensor;
    process the ground image into one or more of a plurality of textures to generate a processed ground image;
    determine an estimated location of the ground image and an estimated location error associated with the estimated location;
    apply a down sampling ratio to the processed ground image;
    partition the processed ground image into a plurality of ground image sub regions;

retrieve a reference image from an atlas of reference images, each reference image in the atlas having an associated accuracy, resolution, and projection, the reference image having a position, projection, and extent determined based on the estimated location and a ground image projection of the ground image;

generate a plurality of matching statistics comprising a matching statistic for each ground image sub region by comparing the ground image sub region to a portion of the reference image;

calculate a relative position of the ground image with respect to the reference image based on the matching statistics;

determine critique data associated with at least one of the one or more navigation subsystems based on the relative position of the ground image with respect to the reference image and a position of the ground image determined using the at least one navigation subsystem, the critique data comprising at least one of an error or a status of the at least one navigation subsystem based on an analysis of the position of the ground image determined using the at least one navigation subsystem in view of the relative position of the ground image with respect to the reference image; and transmit the critique data to a second processor configured to adjust one or more parameters associated with the at least one navigation subsystem based on the critique data, the second processor configured to generate the navigation solution using the adjusted one or more parameters.

* * * * *